United States Patent [19]

Mukai et al.

[11] Patent Number: 4,977,424
[45] Date of Patent: Dec. 11, 1990

[54] LIGHT MEASURING DEVICE FOR CAMERA

[75] Inventors: Hiromu Mukai; Toshihiko Karasaki; Kohtaro Hayashi, all of Osaka, Japan

[73] Assignee: Minolta Camera Kabushiki Kaisha, Osaka, Japan

[21] Appl. No.: 257,204

[22] Filed: Oct. 13, 1988

[30] Foreign Application Priority Data

Oct. 14, 1987 [JP] Japan .................. 62-258596
Oct. 14, 1987 [JP] Japan .................. 62-258597
Oct. 23, 1987 [JP] Japan .................. 62-268832

[51] Int. Cl.$^5$ ................... G03B 7/08; G03B 7/099
[52] U.S. Cl. ................... 354/410; 354/432; 354/478
[58] Field of Search ............ 354/429–434, 354/478, 455, 410, 412

[56] References Cited

U.S. PATENT DOCUMENTS

| Re. 32,376 | 3/1987 | Fukuhara et al. | 354/432 |
|---|---|---|---|
| 3,498,198 | 3/1970 | Fujii | 354/478 |
| 3,683,765 | 8/1972 | Iura | 354/455 |
| 4,387,975 | 6/1983 | Araki | 354/407 |
| 4,391,488 | 7/1983 | Ishizaka et al. | 354/455 X |
| 4,552,446 | 12/1985 | Suda et al. | 354/478 X |
| 4,636,054 | 1/1987 | Saegusa | 354/432 |
| 4,682,871 | 7/1987 | Metabi | 354/400 |
| 4,816,663 | 3/1989 | Utagawa et al. | 250/201 |
| 4,833,498 | 5/1989 | Kato et al. | 354/410 |

FOREIGN PATENT DOCUMENTS 56-104716 8/1981 Japan .
62-86337 4/1987 Japan .
63-128326 5/1988 Japan .

*Primary Examiner*—W. B. Perkey
*Attorney, Agent, or Firm*—Burns, Doane, Swecker & Mathis

[57] ABSTRACT

A light measuring device for an exposure measurement at open aperture, lens-interchangeable photographic camera of a type capable of measuring the brightness of a target object to be photographed through a photo-taking lens assembly for the determination of an exposure amount, which device comprises a reading circuit for reading, from an interchangeable lens assembly, data associated with an exit pupil of the interchangeable lens assembly and data associated with the full aperture value of the interchangeable lens assembly, and a correcting circuit for calculating a correction value for a measured light value on the basis of the data read out by the reading circuit, for the purpose of exposure correction.

12 Claims, 20 Drawing Sheets

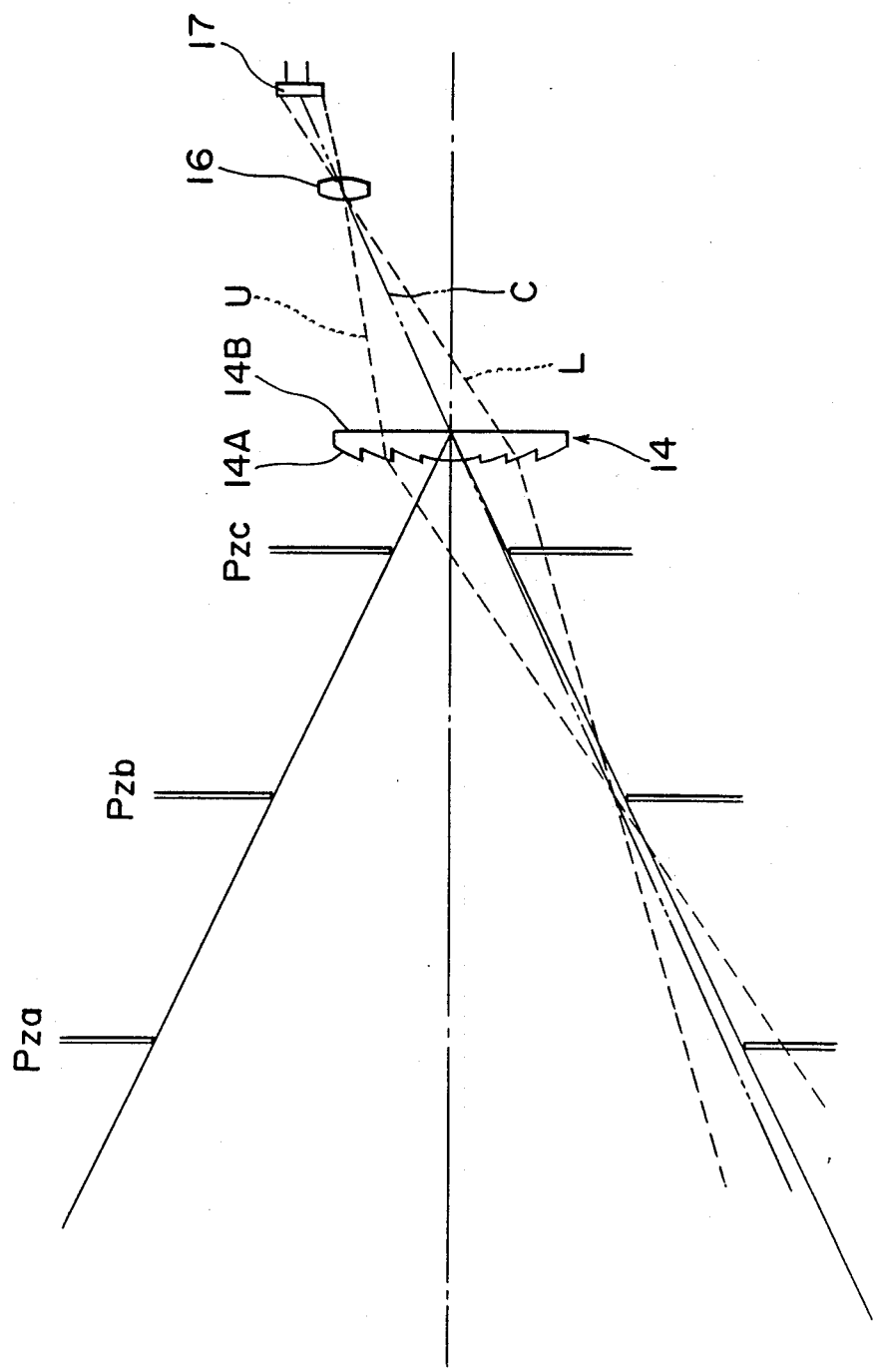

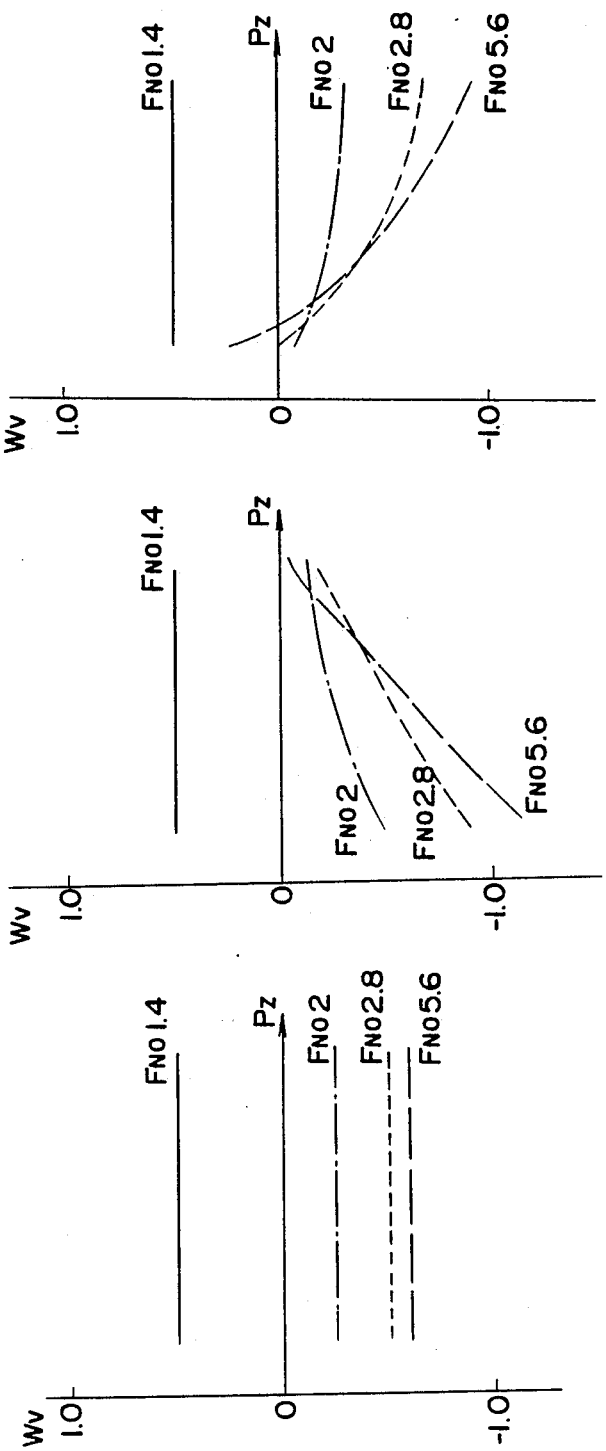

Fig. 10
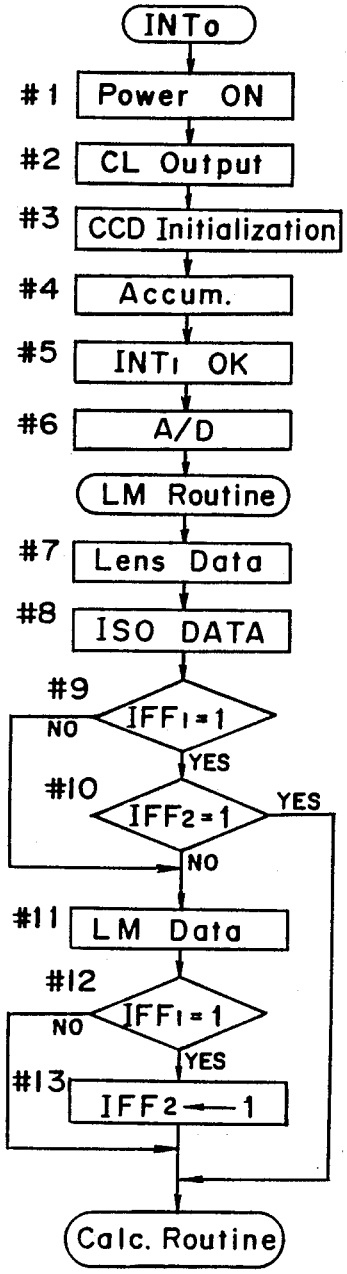
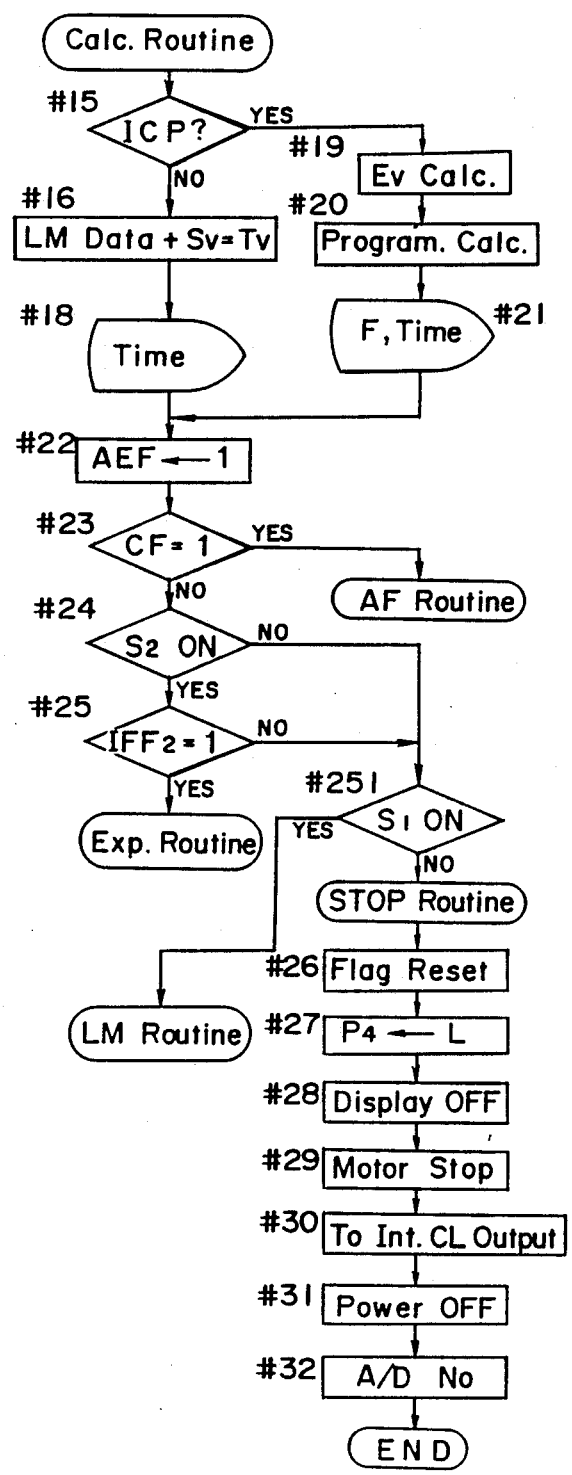

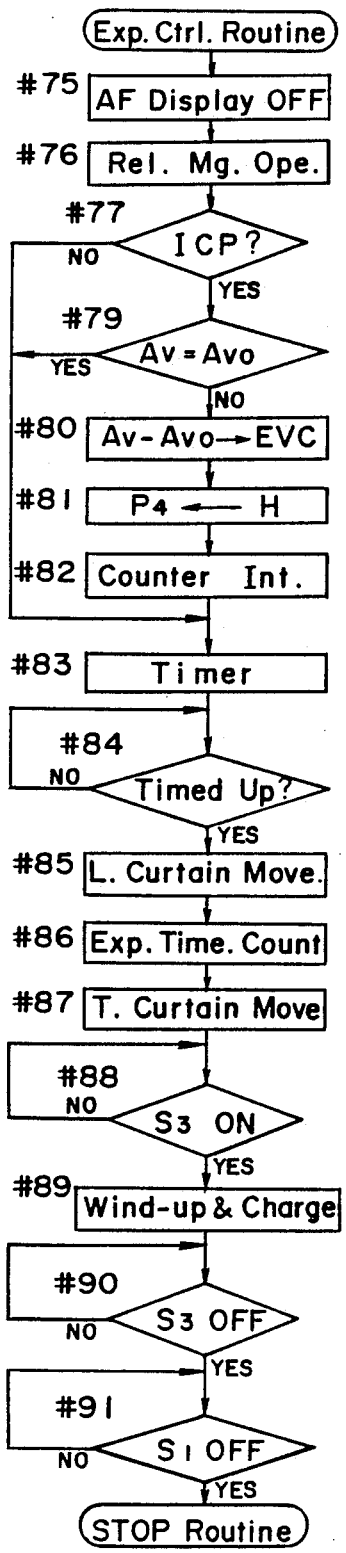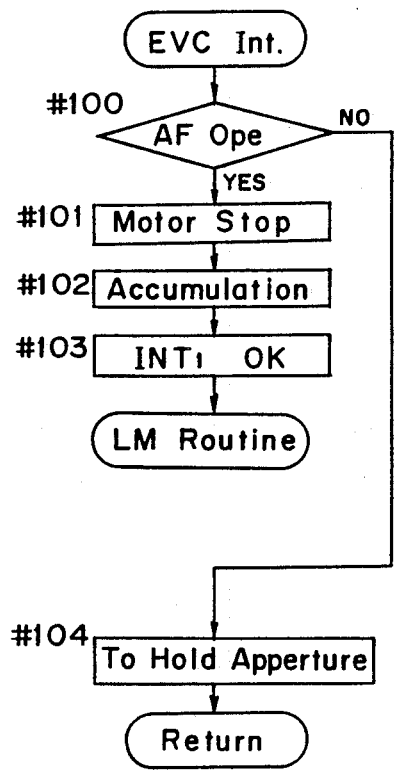
Fig. 11

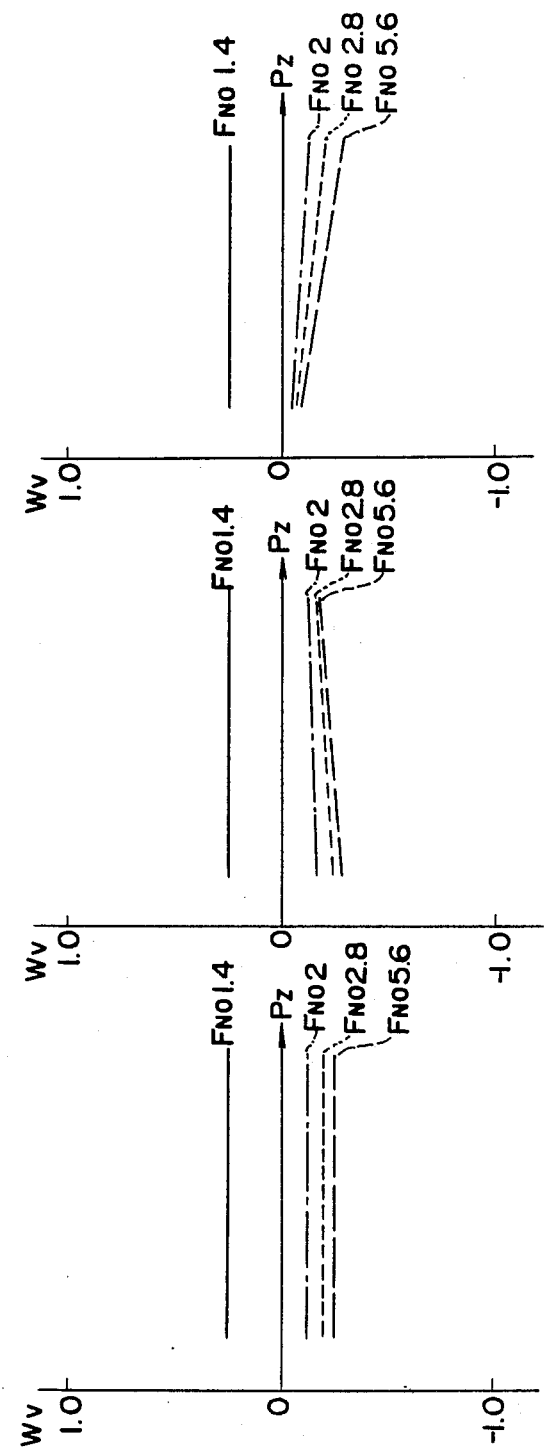

LIGHT MEASURING DEVICE FOR CAMERA

BACKGROUND OF THE INVENTION

1. Field of the Invention

The present invention generally relates to a light measuring device for use in a photographic camera and, more particularly, to the light measuring device particularly for use in a single reflex camera having a lens interchangeable capability.

2. Description of the Prior Art

In a photographic camera having a lens interchangeable capability wherein an exposure value is determined by measuring the incident light flux passing through an interchangeable lens assembly at the full open aperture setting, improvement in the structural details of the light measuring optical system used in a particular photographic camera may bring about an error in the measured light value. If correcting values of the measured light values relative to all the available types of photographic cameras are to be stored in each of the interchangeable lens assemblies, each interchangeable lens assembly must have an increased storage capacity In addition, it is not practical to increase the storage capacity in each interchangeable lens assembly which has been distributed.

In view of the foregoing, the Japanese Laid-open Patent Publication No. 62-86337, published Apr. 20, 1987, discloses a system by which the exposure value determined by measuring the incident light flux passing through a phototaking taking lens assembly can be corrected by a value corresponding to a reciprocal of the distance between the exit-pupil and the image plane.

On the other hand, the Japanese Laid-open Patent Publication No. 56-74226, published June 19, 1981, discloses a system wherein, in a photographic camera equipped with a multi-area light measuring device operable to measure the light reflected from a plurality of regions of the field of view and to calculate a proper measured light output based on the results of measurement at those regions, the results of the measurement at those regions can be corrected using lens information such as, for example, the fully opened aperture value, the number of steps stopped down from fully opened aperture, the focal length and the distance between the exit-pupil and the image plate.

However, the prior art systems discussed above have not been devised with a view to the correction of the measured light value to be effected in the event that the structural details of the light measuring optical system in the camera body are modified for the purpose of improvement. In fact, the prior art systems are merely such that the error occurring in the light measurement with the lens assembly having a different distance from exit-pupil to the image plate is corrected or that the corrected value are calculated with respect to the various regions of the multi-area light measuring device. Because of these reasons, the prior art systems cannot cope with change in structural details of the light measuring optical system and, therefore, no proper corrected value can be calculated.

SUMMARY OF THE INVENTION

Accordingly, the present invention has for its essential object to provide an improved light measuring device for use in a lens-interchangeable photographic camera wherein, no matter what type of light measuring optical system the camera body is provided with, proper exposure correction can be accomplished at all times.

According to the result of studies done by the inventors of the present invention, it is essential to concurrently utilize data related to the full open aperture value of an interchangeable lens assembly and the distance from the exit-pupil and the image plane in order to accomplish the calculation of a proper corrected value from the measured value in fully opened aperture regardless of change in structural detail of the light measuring optical system.

However, the calculation of one corrected value on the basis of two parameters such as the full open aperture value and the distance from exit-pupil to the image plane at all times has a problem in that a relatively long time is required to complete the calculation and, where a data table is utilized for the calculation of the corrected value, there is a problem in that the capacity of the data table tends to become large. Therefore, it may be considered advantageous in that, where the proper corrected value can be calculated with the use of either one of the parameters, the calculation of the corrected value is carried out by the use of such one of the parameters, however, these two parameters are concurrently utilized to calculate the corrected value where the concurrent use of these two parameters is required.

Another important object of the present invention is to provide an improved light measuring device for use in a lens-interchangeable photographic camera wherein, no matter what type of light measuring optical system the camera body is provided with, proper exposure correction can be accomplished at all times and, at the same time, the time required to accomplish the exposure calculation can be reduced.

Hitherto, in the single lens reflex camera having light measuring means for measuring the intensity of light reflected from an object and then passing through the photo-taking lens assembly and also through a focusing screen, a capability of interchanging focusing screen is now available in the market. In such cameras, when the focusing screen forming thereon an image having a brightness different from that of a standard focusing screen is employed, it is suggested to effect a predetermined exposure correction manually.

In the single lens reflex camera having the capability of interchanging the focusing screens, if the focusing screen has a low light diffusing power, the viewfinder will be so bright as to permit a photographer to view an image clearly. Conversely, if the focusing plate having a high light diffusing power is used, the viewfinder will become dark, however, the focusing adjustment can be precisely accomplished and, therefore, the focusing plate having the high light diffusing power is effective where, with the use of a interchangeable lens assembly having a large aperture size, the camera can be precisely focused manually. Moreover, the use of the focusing plate having the high light diffusing power permits the photographer viewing the image through the viewfinder to believe that an eventually formed photographic picture would show exactly what the photographer has viewed through the viewfinder. In view of the foregoing, the capability of use of various focusing screens of different light diffusing power has long been desired.

However, when the light reflected from the object to be photographed is measured after it has passed through the photo-taking lens assembly and the focusing screen, change in light diffusing power of the focusing screen results in an error in light measurement and, therefore, no focusing screens other than those having an equal light diffusing power can be utilized and no variation other than that having, for example, calibrated lines and the presence or absence of a split microprism is available on the focusing screen.

In order to eliminate the occurrence of an error in the light measurement which would result from the change of the focusing screens, it is recommended to arrange the light measuring portion in the vicinity of a mirror box. However, since various members such as a mirror-up device are arranged around the mirror box and, in the single lens reflex camera of TTL metering type having AE and AF capabilities, the positioning of the light measuring portion together with a focus detecting portion may bring about the problem that it is difficult to provide both portions the limited available space and to divide the incoming light for both AE and AF. Accordingly, it is recommended to position the focus detecting portion in the vicinity of the mirror box and the light measuring portion in the viewfinder and, in such case, the occurrence of the error in the light measurement resulting from the change of the focusing screen is unavoidable.

A further object of the present invention is to provide an improved light measuring device for use in a single lens reflex camera wherein the error in the light measurement resulting from the change of the focusing screen can be corrected.

The light measuring device devised to accomplish the above described objects in accordance with the present invention is suited for use in a lens-interchangeable camera having a system of an exposure measurement at open aperture in which the brightness of the object to be photographed is measured through the photo-taking lens assembly to determine an exposure amount. In this type of camera, the light measuring device is provided with a reading means for reading, from the interchangeable lens assembly, data Pz associated with the exit pupil of the interchangeable lens assembly and data Av' associated with the full open aperture value, and a correcting means for calculating a correction value (=Bvo−Bvo') for the measured light value Bvo' on the basis of the data Pz and Av', read out by the reading means, for the purpose of exposure correction.

With this construction, no matter how the light measuring optical system in the camera body is constructed, the correction value for the measured light value can be accurately determined on the side of the camera body with the use of the data Pz and Av' which are associated with the exit pupil and the full open aperture value, respectively, and which are information peculiar to the lens assembly. Accordingly, the storage capacity for the storage of information in any one of the interchangeable lens assembly and the camera body can be minimized.

Also, in order to accomplish the above described objects of the present invention, the present invention is directed to a lens-interchangeable camera of multi-area light metering system wherein the brightness of each portion of a plurality of regions of the field of view including a center region of the image and a peripheral region of the same image is measured at full open aperture setting and a proper exposure amount is determined on the basis of the measured light values $Bv1o'$, $Bvio'$ ($i=2, \ldots, n$) of the respective regions of the image. In accordance with the present invention, this camera is provided with a reading means for reading, from the interchangeable lens assembly, respective data associated with the distance from the exit-pupil to the image plane Pz and the full open aperture value Av', and a correcting means for calculating a correction value on the basis of the full open aperture value Av' with respect to the measured light value $B1o'$ associated with the center region of the image, or calculating a correction value on the basis of both of the full open aperture value Av' and the distance from the exit-pupil to the image plane Pz with respect to the measured light value $Bvio'$ associated with the peripheral region of the image, and then correcting the measured light values $Bv1o'$ and $Bvio'$ of the respective regions of the image.

In this arrangement, in the correcting means for the center region of the image, the correction value can be calculated on the basis of the full open aperture value Av' so that the light measured value $Bvlo$ corrected by the correction value can be obtained. On the other hand, in the correcting means for the peripheral region of the image, the correction value is calculated on the basis of the full open aperture value Av' and the distance between the exit-pupil and the image plane Pz so that the light measured value $Bvio$ corrected by this correction value can be obtained. Then, on the basis of these corrected measured light values $Bvlo$ and $Bvio$, a proper exposure amount can be determined.

Furthermore, in order to accomplish the above described objects of the present invention, the present invention is directed to a single lens reflex camera having a capability of interchanging focusing screens wherein the focusing screen can be replaceably utilized one at a time. In accordance with the present invention, this camera is provided with a light measuring means for measuring the intensity of light reflected from the object and passing through the photo-taking lens assembly, a focusing screen discriminating means for discriminating the type of one of the focusing screens which is actually used, and a correcting means for correcting an error in light measurement, performed by the light measuring means, in dependence on the discriminated type of the focusing plate.

Accordingly, the measured light value Bv' in the light measuring means varies depending on the light diffusing power of the focusing screen, however, the amount of variation thereof is counterbalanced by the correcting means. Therefore, the measured light value Bv having been corrected, which is outputted from the correcting means, can take a value which does not vary with the type of the focusing screen.

BRIEF DESCRIPTION OF THE DRAWINGS

These and other objects and features of the present invention will become clear from the following description taken in conjunction with preferred embodiments thereof with reference to the accompanying drawings, in which:

FIG. 5 is a diagram showing the relationship between rays of light passing through the light measuring optical system;

FIGS. 7(a) to 7(c) are graphs illustrating relationships between errors in light measurement and the distance from the exit-pupil to the image plane, respectively;

FIGS. 10 to 14 are flowcharts showing the sequence of operation of the camera system shown in FIG. 9;

FIGS. 16(a) to 16(c) are graphs illustrating relationships between errors in light measurement, which occur when a focusing screen is replaced, and the distance from the exit-pupil to the image plane in the light measuring optical system according to a different embodiment of the present invention;

DETAILED DESCRIPTION OF THE EMBODIMENTS

Figure 1:
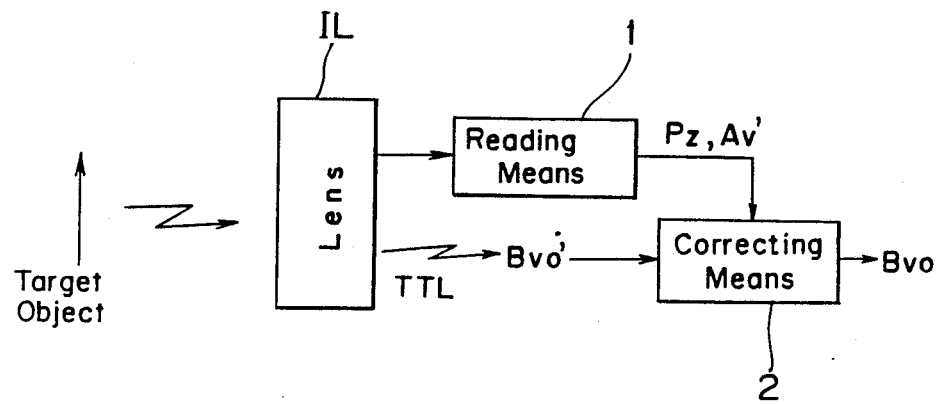
FIGS. 1 to 3 are schematic circuit block diagrams showing the principle of a photographic light measuring system according first to third preferred embodiments of the present invention, respectively.

Before the description of the embodiments of the present invention proceeds, it is to be noted that like parts are designated by like reference numerals throughout the accompanying drawings.

Referring first to FIG. 1 illustrating the principle of a light measuring device according to a first preferred embodiment of the present invention, the light measuring device comprises, in a lens-interchangeable camera having a system of an exposure measurement at open aperture in which the brightness of a target object to be photographed is measured by way of optical flux through an interchangeable photo-taking lens assembly to determine an exposure amount, a reading means 1 for reading, from the interchangeable lens assembly IL, data Pz associated with the exit pupil of the interchangeable lens assembly IL and data Av' associated with the full open aperture value, and a correcting means 2 for calculating a correction value ($=Bvo-Bvo'$) for the measured light value Bvo' on the basis of the data Pz and Av', read out by the reading means 1, for the purpose of exposure correction.

Figure 4:
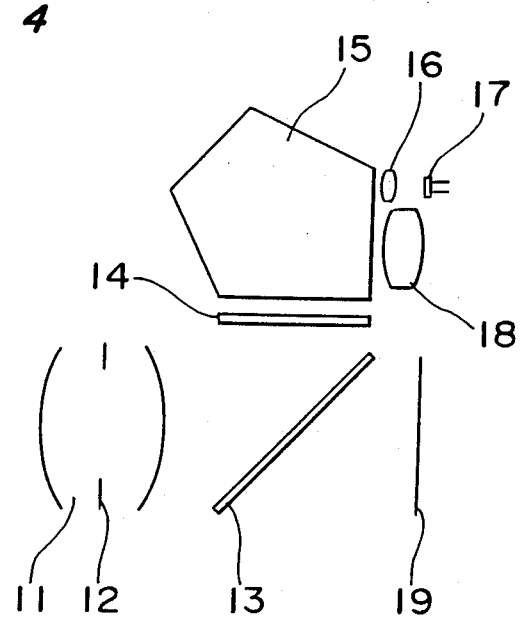
FIG. 4 is a schematic diagram showing the structure of a light measuring optical system embodying the present invention.

More specifically, FIG. 4 shows a typical light measuring optical system used in the single lens reflex camera. The system comprises a photo-taking lens 11, an aperture 12, a focusing screen 14, a quick-return mirror 13 for directing imagewise rays of light which have passed through the photo-taking lens 11 towards the focusing screen 14 a pentagonal roof prism 15, a light measuring lens 16, a light receiving element 17 for receiving rays of light transmitted through the focusing screen 14, then through the pentagonal roof prism 15 and finally through the light measuring lens 16, an eyepiece lens 18 through which a photographer can view the image of the target object formed on the focusing screen 14, and a focal plane 19 in which a photosensitive film is positioned. The light measuring lens 16 is used for converging the rays of light in the case where the light measurement is center-weighted. However, in the case of the multi-area light metering system, that is, in the case where the light measuring area are divided into a plurality of light measuring regions, this light measuring lens 16 is so constructed that the focal plane 19 and a light receiving surface of the light receiving element 17 can assume an optical conjugate relationship with each other. The light receiving element 17 is utilized in the form as divided into a plurality of light receiving segments in the case of the multi-area light metering system.

While the light measuring optical system shown in FIG. 4 is of a construction wherein the rays of light are guided from an upper portion of an exit of the pentagonal roof prism 15, any suitable construction may be employed, for example, the construction wherein the rays of light are guided from opposite sides of the eyepiece lens 18, wherein a light guide is arranged in the vicinity of the focusing screen 14 for receiving the light rays, or wherein the quick-return mirror 13 is employed in the form of a semi-transparent mirror and the light receiving element is arranged inside a mirror box for receiving the light rays.

FIG. 5 illustrates, on an enlarged scale, only a light measuring portion of the light measuring optical system shown in FIG. 4. The focusing screen 14 is shown to have a Fresnel lens face 14A and a focusing face 14B the focusing face 14B being generally in the form of a light diffusing surface for the purpose of image focusing. The focusing face 14B and the light receiving surface of the light receiving element 17 are in conjugate relationship with each other with respect to the light measuring lens 16. Although no error in light measurement will occur if the light receiving element 17 is positioned on the plane (focusing face) where an image is formed by the photo-taking lens, the fact is that the image has to be viewed by a photographer through a viewfinder and the light measurement is carried out in a direction generally slantwise relative to the focusing face and, therefore, an error tends to occur in the light measurement depending on the difference in type of the interchangeable lens assembly. By way of example, how the difference in distance Pz between the focusing face (image plane) and the position of an exit pupil even though the F-number of the interchangeable lens assembly remains the same will bring about the error in light measurement will now be discussed. In FIG. 5, a beam of light to be measured at an upper portion of the focusing screen 14 is designated by U, a beam of light to be measured at a central portion of the focusing screen 14 is designated by C, and a beam of light to be measured at a lower portion of the focusing screen 14 is designated by L. Since the light beam C to be measured at the central portion of a screen is not vignetted regardless of the distance between the exit-pupil and the focusing face, the measured light value will not vary substantially. On the other hand, the light beam U to be measured at the upper portion of the screen will not be vignetted if the lens assembly has a short distance Pzc from the exit pupil to the focusing face, but will be vignetted, if the lens assembly has a long distance Pza, and, therefore, the intensity of the light beam C will be deemed lower than the actual intensity. Conversely, the light beam L to be measured at the lower portion of the screen exhibits a tendency generally reverse to that exhibited by the light beam U to be measured at the upper portion of the screen.

Figure 6A:
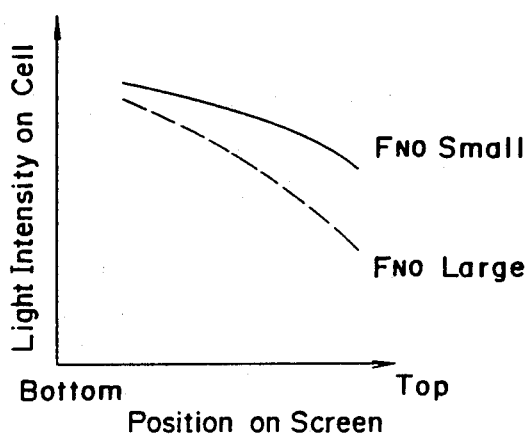
FIGS. 6(a) to 6(c) are graphs illustrating relationships between the intensity of light falling on a light receiving cell of the light measuring optical system and various positions on a picture, respectively.
Figure 6B:
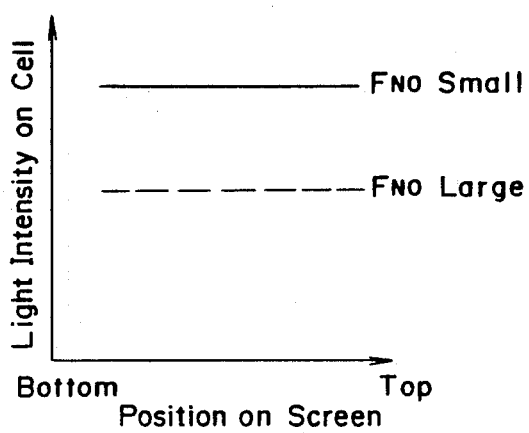
Figure 6C:
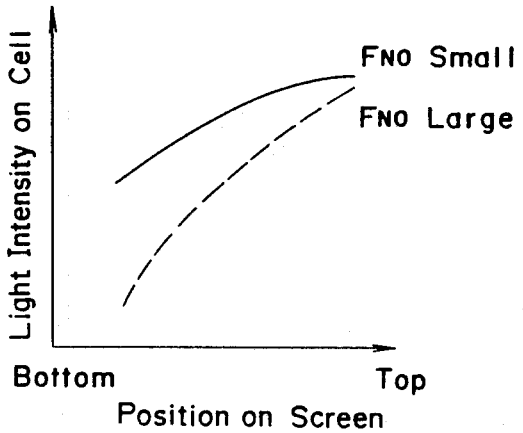

FIGS. 6(a) to 6(c) illustrate the relationships between the intensity of light falling on a light receiving cell of the light receiving element 17 and various positions of the screen that are exhibited by the respective photo-taking lens assemblies having different distances Pza, Pzb and Pzc shown in FIG. 5. With the lens assembly having the long distance Pza from the exit pupil to the focusing face, as shown in FIG. 6(a), the intensity of light passing through the upper portion of the screen and falling on the light receiving cell is low, and, with the lens assembly having the short distance Pzc, as shown in FIG. 6(c), the intensity of light passing through the lower portion of the screen and falling o the light receiving cell is low. With the lens assembly having the distance Pzb, since the pupil of the light measuring optical system is projected on the position of the exit pupil of the photo-taking lens by the image forming action of the Fresnel lens face 14A of the focusing screen 14, the light beams U and L at the upper and lower portions of the focusing screen 14, respectively, are converged at the position of the exit-pupil wherefore, as shown in FIG. 6(b), the difference between the intensities of light at the upper and lower portions of the screen is not substantial.

When the F-number of the photo-taking lens assembly changes, and when the F-number of the photo-taking lens assembly having the long distance Pza from the exit pupil to the focusing face increases (that is, the aperture becomes small), reduction of the intensity of light at the upper portion of the screen is considerable. On the other hand, with the lens assembly having the short distance Pzc from the exit pupil to the focusing face, reduction of the intensity of light at the lower portion of the screen is considerable.

Assuming that the lens assembly which can be termed the standard lens assembly has a focal length of 50 mm and F-number of 1.7, and if the intensity of light falling on the light receiving cell of the light receiving element in the standard lens assembly and the intensity of light falling on the photosensitive film in the standard lens assembly are expressed by Cs and Is, respectively, and, also, if the intensity of light falling on the light receiving cell of the light receiving element in an interchangeable lens assembly and the intensity of light falling on the photosensitive film in the interchangeable lens assembly are expressed by Ci and Ii, respectively, an exposure error attributable to the light measuring optical system will be zero if the following equation is satisfied.

$$Cs/Ci = Is/Ii \quad (1)$$

In practice, as explained with reference to FIGS. 5 and 6, the intensity of light falling on the light receiving cell varies with the distance Pz from the exit pupil to the focusing face and the F-number (aperture size) and, therefore, the above discussed equation (1) cannot be satisfied. The exposure error resulting from the fact that the above described equation (1) cannot be satisfied is referred to as an light measurement error Wv and is defined by the following equation.

$$Wv = \log_2 Cs/Ci - \log_2 Is/Ii \quad (2)$$

While the vignetting of the light flux varies considerably with light diffusing characteristic of the focusing screen 14, the characteristics shown in FIG. 6 are those obtained during a simulated test in which a representative light diffusing characteristic of the focusing screen 14 is employed.

FIG. 7 illustrates respective graphs obtained by replacing the tendencies shown in FIG. 4 with the distance Pz from the exit pupil to the focusing face and the light measurement error Wv. The light measurement error Wv at the central portion of the screen does not vary considerably with the distance Pz as shown in FIG. 7(a). Since with the interchangeable lens assembly of F 1.4 the aperture is larger than the light flux spreading due to the light diffusing power of the focusing screen 14, the measured light value does not deviate from that exhibited by the standard lens assembly. However, since the amount of light falling on the film plane is brighter by 0.5 Ev, there arises a light measurement error of 0.5 Ev. Conversely, with the interchangeable lens assembly having a larger F-number than the standard lens assembly having the F-number of 1.7, the intensity of light falling on the light receiving cell is higher than the amount of light from which the amount of light is reduced as a result of variation of the F-number. The reason for this is supposed that; even with the standard lens assembly having the F-number of 1.7, the aperture of the lens is larger than the light flux entering the light measuring portion.

The light measurement error Wv at the upper portion of the screen is such as shown in FIG. 7(b) and, since with the interchangeable lens assembly having the F-number of 1.4 the aperture is larger than a light flux area necessitated for the light measurement, the light measurement error Wv does not vary with the distance Pz from the exit pupil to the focusing face. Conversely, with the interchangeable lens assembly having a large F-number, variation with the distance Pz from the exit pupil to the focusing face is considerable and, in the event that the distance Pz from the exit pupil to the focusing face becomes small, the light measurement error Wv will result in an underexposure.

The light measurement error Wv at the lower portion of the screen is such as shown in FIG. 7(c) and, since with the interchangeable lens assembly having the F-number of 1.4 the aperture is larger than a light flux area necessitated for the light measurement, the light measurement error Wv does not vary with the distance Pz from the exit pupil to the focusing face. Conversely, with the interchangeable lens assembly having a large F-number variation with the distance Pz from the exit pupil to the focusing face is considerable and, in the event that the distance Pz from the exit pupil to the focusing face becomes large, the light measurement error Wv will result in an underexposure.

Figure 8:
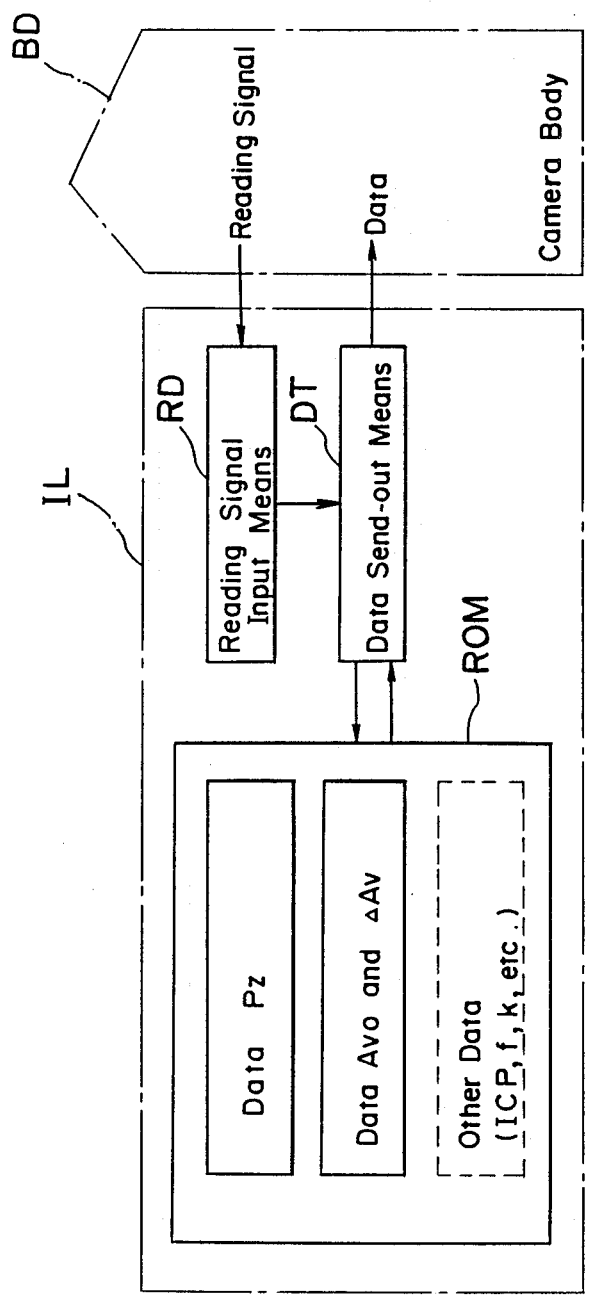
FIG. 8 is a schematic circuit block diagram showing a communication system in a camera system embodying the present invention.

FIG. 8 illustrates a concept of data communication between the interchangeable lens assembly IL and a camera body BD. A storage means ROM built in the interchangeable lens assembly IL stores the distance Pz from the exit pupil to the focusing face as a data associated with the exit pupil, both of the full open aperture value Avo and the amount of change in aperture (hereinafter referred to as the aperture change amount) ΔAv resulting from the zooming operation as a data associated with the aperture, and various other data as will be described later. When a read-out signal from the camera body BD is applied to a read-out signal input means RD in the interchangeable lens assembly IL, the above described data are serially supplied to the camera body BD by a data send-out means DT.

Figure 9:
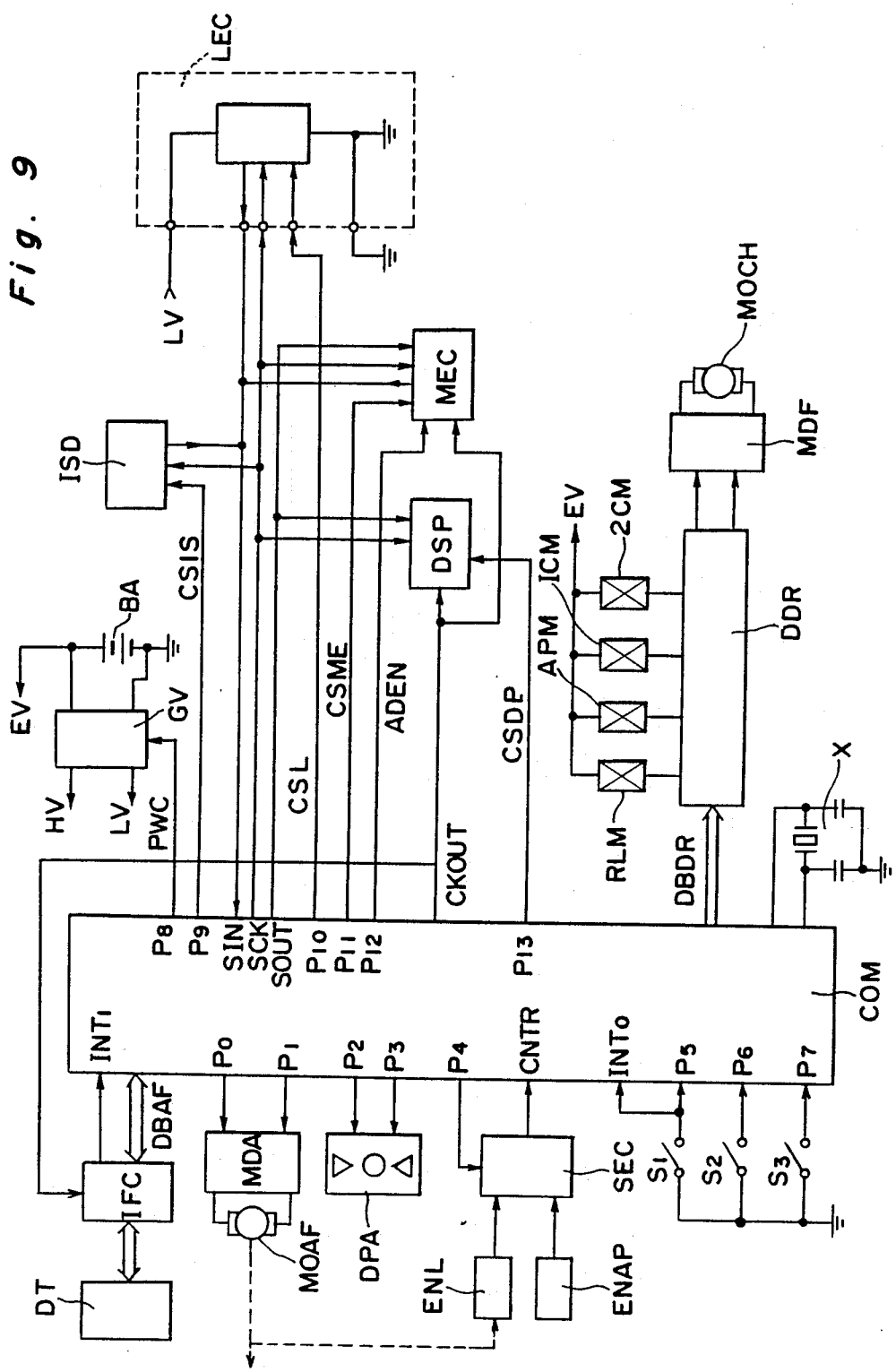
FIG. 9 is a circuit block diagram showing the electric circuitry used in the camera system utilizing the light measuring optical system according to the present invention.

FIG. 9 illustrates one embodiment of the electric circuitry used in the camera system to which the present invention is applied. In FIG. 9, reference character DT represents a light receiving unit including a CCD image sensor array for the focus detection. Reference character IFC represents an interface circuit operable to control the operation of the CCD image sensor array. This interface circuit IFC has a function of transmitting a signal, which has been read out by the CCD image sensor array and subjected to an analog-to-digital conversion, to a microcomputer COM through a data bus DBAF and also a function of transmitting the termination of a charge accumulating operation of the CCD image sensor array to an interruption input terminal INT1 of the microcomputer COM. The time during which the charge accumulating operation of the CCD image sensor array is carried out is controlled by an output generated from a light receiving unit (not shown) for monitoring the brightness of the target object to be photographed.

Reference character MOAF represents a lens drive motor for AF purpose, and reference character MDA represents a motor control circuit. The motor control circuit MDA can perform various control operations including the driving of the lens drive motor MOAF in one of the opposite directions, the braking of the lens drive motor MOAF and the stopping of the lens drive motor MOAF. Reference character DPA represents a display unit operable in response to respective signals from output ports p2 and p3 of the microcomputer COM to display the direction of movement of the lens, an infocus condition, a defocus condition and a warning sign descriptive of the incapability of automatic focus detection.

Reference character ENL represents an encoder for outputting a pulse used to monitor the amount of drive of the lens (the amount of rotation of the motor) driven by the lens drive motor MOAF, and reference character ENAP represents an encoder for outputting a pulse used to monitor the amount of the aperture of the lens stopped down. Reference character SEC represents a data selector operable to supply the pulse from the encoder ENL and the pulse from the encoder ENAP to an input terminal CNTR of an event counter in the microcomputer COM when an output port p4 of the microcomputer COM is in a logic low level state and when the output port p4 of the microcomputer COM is in a logic high level state, respectively. The microcomputer COM has the event counter built therein and is preset with data. Contents stored in the event counter are counted down each time a pulse is applied to the terminal CNTR of the microcomputer COM, and interruption is effected when the contents of the event counter is counted down to zero.

Reference character S1 represents a light measuring switch which is closed during the depression of a shutter release button through a first half of its full stroke. A closure signal generated from the light measuring switch S1 when the latter is closed is supplied to an interruption input terminal INTo and an input port p5 of the microcomputer COM. Reference character S2 represents a release switch which is closed when the shutter release button is completely depressed through the full stroke. A closure signal generated from the release switch S2 when the latter is closed is supplied to an input port p6 of the microcomputer COM. Reference character S3 represents a reset switch adapted to be closed upon the completion of an exposure control operation and to be opened upon the completion of a film winding and a subsequent charging. A closure signal generated from this reset switch S3 when the latter is closed is supplied to an input port p7 of the microcomputer COM.

Reference character GV represents a power source circuit adapted to be operated when a power source control signal PWC outputted from an output port p8 of the microcomputer COM is in a logic low level state. This power source circuit GV provides a high voltage HV and a low voltage LV in dependence on an output from a power source battery BA. The high voltage HV provides a source of electric power for both of the light receiving unit DT and the interface circuit IFC, whereas the low voltage LV provides a source of electric power not only for the display unit DPA, the encoders ENL and ENAP and the data selector SEC, but also for a film sensitive read-out circuit ISD, a lens circuit LEC, a light measuring and analog-to-digital converting circuit MEC and a decoder driver DDR as will be described later. The motor control circuit MDA and another motor control circuit MDF, the display circuit DSP and the microcomputer COM are powered directly by the power source battery BA through a power line EV.

The film sensitivity read-out circuit ISO is operable to read out an ISO data formed on a film container and descriptive of the film sensitivity and to supply the film sensitivity data serially to a serial input terminal SIN of the microcomputer COM in synchronism with a serial clock SCK, supplied from the microcomputer COM, when a film sensitive read-out circuit selecting signal CSIS outputted from an output port p9 of the microcomputer COM is in a logic low level state. The lens circuit LEC is embedded in the interchangeable lens assembly and is of a construction such as disclosed in the Japanese Laid-open Patent Publication No. 59-140408. This lens circuit LEC is operable to supply various data, stored in a read-only memory in the lens circuit LEC, in synchronism with the serial clock SCK, supplied from the microcomputer COM, when a lens circuit selecting signal CSL outputted from an output port p10 of the microcomputer COM is in a logic low level state. Hereinafter, the data permanently stored in the read-only memory of the lens circuit LEC will be explained for each of the lens assembly having a fixed focal length and a zoom lens assembly.

TABLE 1

| Address | Data |
| --- | --- |
| 01 | Mount Signal (ICP) |
| 02 | Full Open Aperture Value (Avo) |
| 03 | Aperture Change Amount (ΔAv = 0) |
| 04 | Distance Pz from Exit Pupil to Focusing Face |
| 05 | Focal Length (f) |
| 06 | Conversion Coefficient (K) |
| 50-6F | Distance Signal (L) |

TABLE 2

| Address | Data |
|---|---|
| 01 | Mount Signal (ICP) |
| 02 | Full Open Aperture Value (Avo) |
| 10–1F | Aperture Change Amount (ΔAv) |
| 20–2F | Distance Pz from Exit Pupil to Focusing Face |
| 30–3F | Focal Length (f) |
| 40–4F | Conversion Coefficient (K) |
| 50–6F | Distance Signal (L) |

Tables 1 and 2 illustrate addresses and data contents in the interchangeable lens assembly. In particular, Table 1 illustrates the contents stored in the read-only memory in the lens assembly of fixed focal length, whereas Table 2 illustrates those stored in the read-only memory in the zoom lens assembly. In each of these Tables 1 and 2, at the address 01, data common to all of the lens assemblies are permanently stored as the mount signal ICP. At the address 02, the full open aperture value Avo is stored and, in the case of the zoom lens assembly, the full open aperture value at the smallest focal length is stored. At the address 03, the aperture change amount (ΔAv=0) of an lens assembly having a single focal length is stored; at the address 04, the distance Pz from the exit pupil to the focusing face of the lens assembly having the single focal length is stored; at the address 05, the focal length f of the lens assembly having the single focal length is stored; and, at the address 06, the coefficient K used to convert the defocus amount into a driving amount of the lens drive motor MOAF in the case of the lens assembly having the single focal length is stored.

In the case of the zoom lens assembly, least four bits of the addresses 10 to 4F are specified by a signal obtained from the zoom encoder according to the zooming. At addresses 10 to 1F, the data ΔAv representative of the amount of change of the aperture resulting from the zooming is stored; at the addresses 20 to 2F, the distance Pz from the exit pupil to the focusing face variable with the zooming is stored; at the addresses 30 to 3F, the focal length f variable with the zooming is stored; and, at the addresses 40 to 4F, the coefficient K used to convert the defocus amount into a driving amount of the lens drive motor MOAF in the case of the zoom lens assembly is stored. At the addresses 50 to 6F, the distance signal L of the target object obtained from a positional data of a focusing lens in each of the lens assembly having the single focal length and the zoom lens assembly is stored.

The display circuit DSP is operable to effect a display on the basis of display data supplied from the microcomputer COM. The light measuring and analog-to-digital converting circuit MEC is operated, when the low voltage LV is supplied thereto from the power source circuit GV, to initiate the light measuring operation, and the analog-to-digital conversion is repeated at a predetermined cycle when an A/D conversion permitting signal ADEN outputted from an output port p12 of the microcomputer COM is in a logic low level state. Then, when a light measuring and A/D converting circuit selecting signal CSME outputted from an output port p11 of the microcomputer COM is in a logic low level state, the data which has been subjected to the analog-to-digital conversion and latched are serially supplied to the microcomputer COM in synchronism with the serial clock SCK.

Reference character DDR represents a load drive circuit operable to decode the data supplied from the microcomputer COM through the data bus DBDR and to drive a load according to a result of decoding. The load may include, for example, a release magnet RLM, an aperture controlling magnet APM, a leading curtain controlling magnet 1CM, a trailing curtain controlling magnet 2CM, a motor MOCH for winding the film and for charging an exposure control mechanism and a driver MDF therefor.

With reference to FIGS. 10 to 14, the operation of the camera system embodying the present invention will be described. Assuming that the shutter release button is manipulated, the depression of the shutter release button through the first half of the full stroke results in the closure of the light measuring switch S1 and, as a result thereof, an interruption signal is supplied to the interruption input terminal INTo causing the microcomputer COM to execute an interruption routine INTo shown in FIG. 10. At the start of the interruption routine of FIG. 10, a power source control signal PWC outputted from an output port p8 is rendered in a logic low level state, causing the power source circuit GV to operate at step 1. Then, reference clocks CKOUT are outputted at step 2 to the interface circuit IFC, the display circuit DSP, and the light measuring and analog-to-digital converting circuit MEC to accomplish a CCD initializing operation for sweeping out a charge accumulated in CCD at step 3. Thereafter, the charge accumulating operation of CCD is started at step 4, a reception of an interruption signal by the interruption input terminal INT1 upon the completion of the charge accumulating operation is enabled at step 5, followed by step 6 at which the A/D conversion permitting signal ADEN from the output port p12 is rendered in a logic low level state so that the measured light value can be subjected to the analog-to-digital conversion.

After step 6, a light measuring routine is executed, during which the lens data from the interchangeable lens assembly and the film sensitivity data (ISO data) from the film container are inputted at steps 7 and 8, respectively. Then, a decision is made successively at steps 9 and 10 to determine the respective states of flags IFF1 and IFF2. The flag IFF1 is adapted to be set to 1 when an infocus condition is attained, while the flag IFF2 is adapted to be set when light measuring data are read in subsequent to the attainment of the infocus condition. Accordingly, when no infocus condition has not yet been attained or when no light measuring data is read in even though the infocus condition has been attained, the light measuring data are read in at step 11, or the flag IFF2 is set to 1 after the data have been read in subsequent to the attainment of the infocus condition, followed by the execution of a calculating routine (steps 12 and 13).

Figure 12:
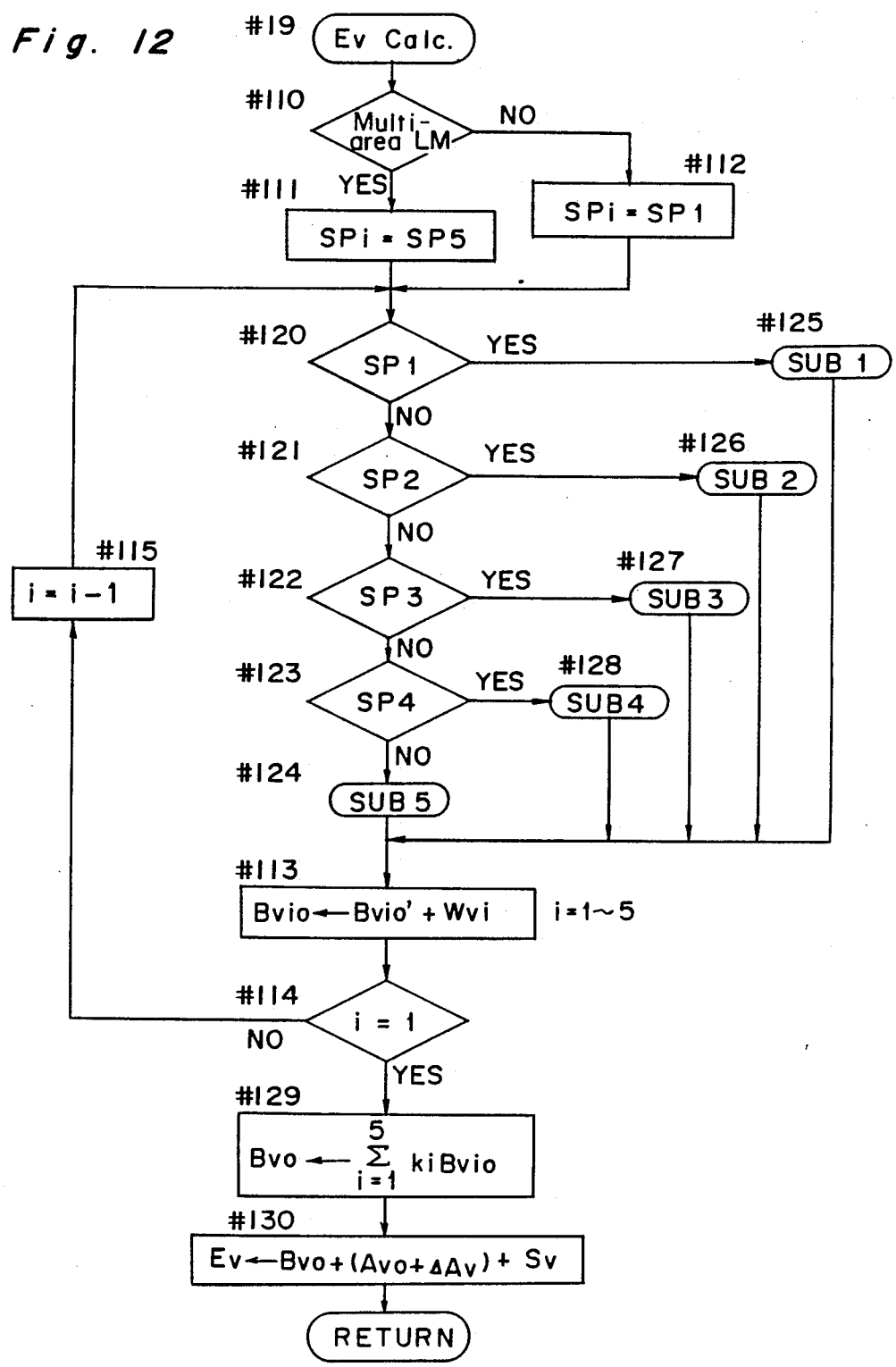

During the execution of the calculating routine, a decision is first made at step 15 to determine if the mount signal ICP of the lens assembly is inputted. If the mount signal ICP has been inputted or has not yet been inputted, the program flow proceeds to step 19 or 16, respectively. Where the lens assembly has not yet been mounted, this means that the control of the aperture is impossible as a matter of fact and, therefore, there is no other way than to deem the aperture being fixed. In view of this, at step 16, an exposure time Tv is calculated by adding the ISO value Sv, descriptive of the film sensitivity, to the light measuring data (=Bv−Av, wherein Bv represents the brightness of the target object and Av represents the fixed aperture value). At step 18, the exposure time is displayed while the F number is displayed in the form of a warning display (for example, "- -". On the other hand, at step 19, as shown in the flowchart of FIG. 12 as will be described later, an exposure value Ev is calculated on the basis of a true measured light value obtained by correcting the light measurement error. By performing a programmed exposure calculation at step 20 on the basis of this exposure value Ev, the aperture value Av and the exposure time Tv are calculated which are then displayed at step 21.

When the foregoing operation completes, a flag AEF is set to 1 at step 22. This flag AEF is of a type which is set to 1 when the exposure calculation completes. Then at step 23, a decision is made to determine if a flag CF is set to 1, followed by the execution of an AF routine only if the flag CF is found having been set to 1. The flag CF is provided for the purpose that, if no single calculating operation is not yet completed when the charge accumulating operation of CCD completes during the execution of a light measuring routine or a calculating routine, the remaining exposure calculation can be executed after the data have been read in from CCD to permit the program flow to proceed from this step to the AF routine (steps 22 and 23).

At step 24, a decision is made to determine if the release switch S2 is closed. At subsequent step 25, a decision is made to determine if an exposure control value is calculated with the light measuring data obtained subsequent to the attainment of the infocus condition. Should the respective results of decisions at steps 24 and 25 indicate "YES", an exposure routine is executed to effect the exposure control operation. On the other hand, if the respective results of decision at steps 24 and 25 indicate "NO", the program flow proceeds to step 251 at which a decision is made to determine if the light measuring switch S1 is closed. In the event that the light measuring switch S1 is closed, the program flow returns to the light measuring routine, but if it is not closed, a stop routine is executed.

When the stop routine is to be executed, and at step 26, all of flags are reset, followed by step 27 at which the output port p4 is rendered in a logic low level state. Then, at step 28, data necessary to turn the display off (with no information displayed) are supplied to the display circuit DSP, followed by the stoppage of the motor MOAF. Thereafter, output of the reference clocks CKOUT is interrupted at step 30, the power source circuit GV is inactivated at step 31, and the signal ADEN is rendered in a logic high level state to disable the analog-to-digital conversion at step 32, resulting in that the microcomputer COM is brought to a halt.

Where the result of decision at step 24 indicates that the release switch S2 is closed and the result of the subsequent decision at step 25 indicates that the flag IFF2 is set to 1, the exposure control routine shown in FIG. 11 is executed.

Referring now to FIG. 11, and at step 75, an AF display is turned off, followed by step 76 to activate the release magnet RLM to initiate the operation of the exposure control mechanism. Then, at step 77, a decision is made to determine if the interchangeable lens assembly is mounted. If the interchangeable lens assembly is not mounted, the program flow proceeds to step 83 without aperture stop-down control being performed. On the other hand, if the result of decision at step 77 indicates that the interchangeable lens assembly is mounted, the program step 79 takes place at which a decision is made to determine if a controlled aperture value Av is equal to the full open aperture value Avo. If the result of decision at step 79 indicates that the controlled aperture value Av is equal to the full open aperture value Avo, the program flow skips to step 83. On the other hand, if the result of decision at step 79 indicates that the controlled aperture value Av is not equal to the full open aperture value Avo, the number of steps of the aperture to be stopped down, which is the difference between the controlled aperture value Av and the full open aperture value Avo, is set in an event counter EVC at step 80 and the port p4 is subsequently rendered to be in a logic high level state at step 81 so that at step 82 a pulse from the encoder ENAP for monitoring the number of steps of the aperture to be stopped down can be outputted from the selector SEC. Thereafter, at successive steps 83 and 84, a wait is made until a predetermined time set in a timer can be timed up. During this time, the aperture stop-down operation is carried out and, when as a result interruption is effected to the event counter, the aperture magnet APM is activated at step 104 to interrupt the aperture stop-down operation. After a predetermined time, the reflex mirror is swung up, followed by the leading curtain magnet 1CM to initiate the movement of the leading curtain at step 85 and, at the same time, at step 86, an exposure time counting is performed. Upon the completion of the exposure time counting, the trailing curtain magnet 2CM is activated to initiate the movement of the trailing curtain at step 87. Thereafter, a wait is made at step 88 until the movement of the trailing curtain completes, followed by the switching on of the reset switch S3. When the reset switch S3 is so switched on, the motor MOCH for the charging is activated to effect the film winding operation and the charging of the exposure control mechanism at step 89 and, then, a wait is made at step 90 until the reset switch S3 is switched off subsequent to the completion of the film winding and the charging of the exposure control mechanism. If the result of decision at step 90 indicates that the reset switch S3 is switched off, the stop routine is executed until the microcomputer COM is operated subsequent to the closure of the light measuring switch S1.

Hereinafter, an exposure calculating method will be discussed. Assuming that the exposure value, the aperture value to be controlled, the shutter speed (the exposure time), the brightness of the target object and the film sensitivity are expressed by Ev, Av, Tv, Bv and Sv, all expressed in terms of respective values according to, the APEX system, the following relationship can be established.

$$Ev = Av + Tv = Bv + Sv$$

The brightness Bv of the target object can be obtained through the light measuring optical system shown in FIG. 2, and a measured light data Bvo' obtained in the camera body can be expressed as follows.

$$Bvo' = Bv - (Avo - \Delta Av)$$

In the above equation, the term $(Avo + \Delta Av)$ represents the full open aperture value of the interchangeable lens assembly. In practice, as shown in FIGS. 5 to 7, to obtain the true measured light value Bvo, correction depending on the scope over which the light measurement is effected and the details of the light measuring optical system is required. Accordingly, the true measured light value Bvo can be expressed by the following equation if a correction value (that is, the light measurement error) is expressed by Wv.

$$Bvo = Bvo' + Wv$$

The correction value Wv will be required in a plural number in the case of a multi-area light metering system.

Figure 15:
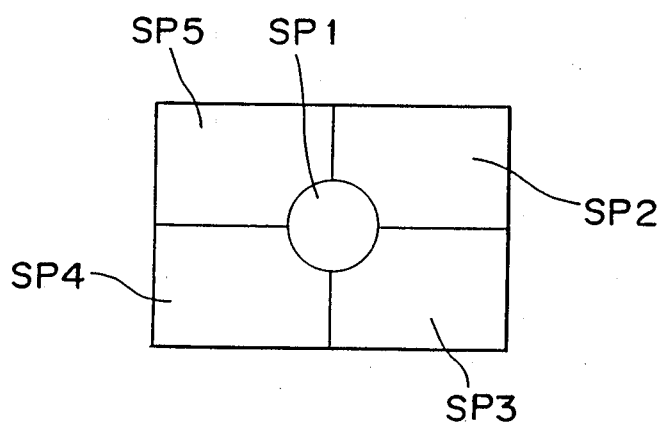
FIG. 15 is a schematic diagram showing light measuring areas in the light measuring optical system used in the camera system of FIG. 9.

FIG. 15 illustrates an example of division of the screen in the case of the multi-area light metering system. Before the description of how the correction values are calculated in the multi-area light metering system proceeds, the principle thereof will first be described with particular reference to FIG. 2.

Figure 2:
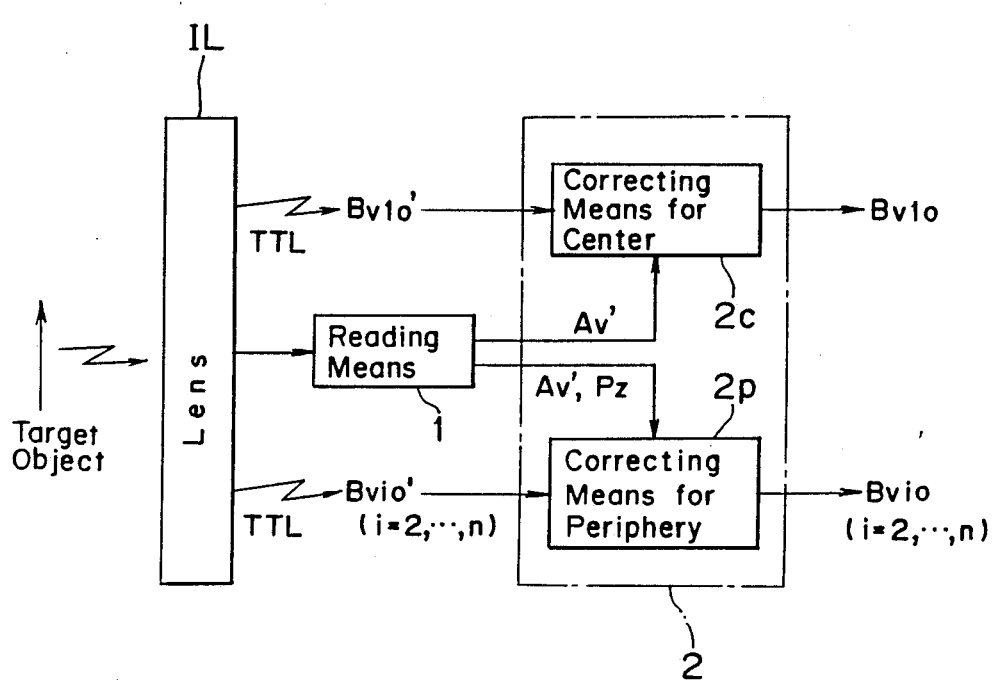

According to the multi-area light metering system shown in FIG. 2, the brightness of each portion of a plurality of regions of the field of view including a center region of the image and a peripheral region of the same image is measured at full open aperture setting and a proper exposure amount is determined on the basis of the measured light values Bvlo' and Bvio' (i=2, ..., n) of the respective regions of the image. In accordance with this embodiment of the present invention, this camera is provided with a reading means 1 for reading, from the interchangeable lens assembly, respective data associated with the distance Pz from the exit pupil to the focusing face and the full open aperture value Av'. The respective data associated with the distance Pz from the exit pupil to the focusing face and the full open aperture value Av' read out by the reading means 1 are supplied to a correcting means 2. The correcting means in this illustrated embodiment comprises a first correcting means 2c associated with the central region of the field of view and a second correcting means 2p associated with the peripheral region of the same field of view. In the first correcting means 2c, the correction value is calculated on the basis of the full open aperture value Av' which is utilized to provide the measured light value Bvlo corrected by this correction value. On the other hand, in the second correcting means 2p, the correction value is calculated on the basis of both of the full open aperture value Av' and the distance Pz from the exit pupil to the focusing face which is utilized to provide the measured light value Bvio corrected by this correction value. A proper exposure amount is then determined with the use of information on these measured light values Bvio and Bvlo.

Referring now to FIG. 15, reference characters SP1 to SP5 represent respective light receiving elements for the light measurement. In particular, SP1 represents the light receiving element for measuring the intensity of light at the central portion of the screen, and SP2 to SP5 represent the respective light receiving elements for measuring the intensities of light at peripheral portions of the screen around the central portion assigned to the light receiving element SP1.

FIG. 12 illustrates an EV calculating routine performed at step #19 in the program flow of FIG. 10. Assuming that the screen in the multi-area light metering system is divided into five areas, correction values associated with the light receiving elements SPi (wherein i represents the cell number ranging from 1 to 5) are calculated during execution of respective subroutines SUB1 to SUB5 as shown by steps #120 to #128. Once the respective correction values Wvi associated with the respective light receiving elements SPi are determined, true brightness values Bvio associated with the respective light receiving elements SPi are determined at step #113. When each of the brightness values Bio is weighted by a coefficient ki preset for each cell number i and all of the brightness values are then summed together, a proper brightness value Bvo can be calculated at step #129 and, therefore, an exposure value Ev is then obtained at step #130. It is to be noted that, where instead of the multi-area light metering system a center-weighted metering system is employed, all that are necessary is to determine the correction value Wv1 associated only with the light receiving element SP1 having the cell number i of 1 and the calculation of the correction values Wv2 to Wv5 associated with the light receiving elements SP2 to SP5 having the cell number i of 2 to 5 (steps #110 to #115) is omitted for the purpose of enhancing the speed of calculation of the exposure value. In such case, at step #129, the measured light value after the correction made with respect to the light receiving element SP1 used to measure the intensity of light at the central portion of the screen can be used as Bvo.

Figure 13:
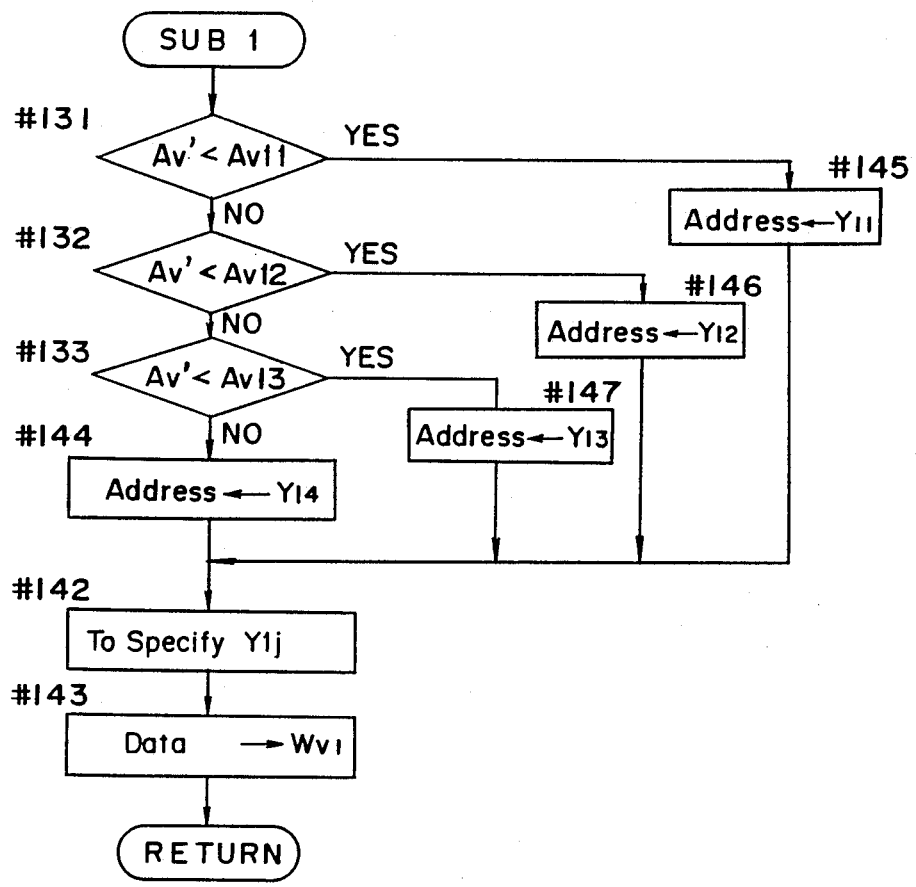

FIG. 13 illustrates the details of the subroutine SUB1 necessitated for the determination of the correction value Wv1 for the measured light value at the full open aperture value which corresponds to the central area of the screen. The measured light value at the central portion of the screen has no relation with the distance Pz from the exit pupil to the focusing face of the interchangeable lens assembly and varies only with the full open aperture value. Accordingly, the light measurement correction value Wv1 of the interchangeable lens assembly can be determined in dependence on the full open aperture value Av' (=Avo+ΔAv) as shown in Table 3.

TABLE 3

| Av' | Wv1 |
|---|---|
| Smaller | W1 |
| Av11 | W2 |
| Av12 | W3 |
| Av13 | W4 |
| Larger | |

Referring to FIG. 13, if at step #131 it is determined that the full open aperture value Av' is smaller than Av11, Y11 is set as an address at step #145. If at step #132 it is determined that Av' is larger than or equal to Av12, but smaller than Av12, Y12 is set as an address at step #146. If at step #133 it is determined that Av' is larger than or equal to Av12, but smaller than Av13, Y13 is set as an address at step #147. However, if at step #133 it is determined that Av' is equal to or larger than Av13, Y14 is set as an address at step #144. In this way, any one of the positions shown in Table 3 can be set with an address data Y1j and, with this address data Y1j, a ROM table in which the correction values W1 to W4 in Table 3 are stored can be specified, one of said correction values W1 to W4 being chosen to be the correction value Wv1. It is to be noted that the correction values W1 to W4 shown in Table 3 are expressed by $(Av' = \log_2 Fno^2)$ and are so determined as to satisfy the relationship shown in FIG. 7(a).

Figure 14:
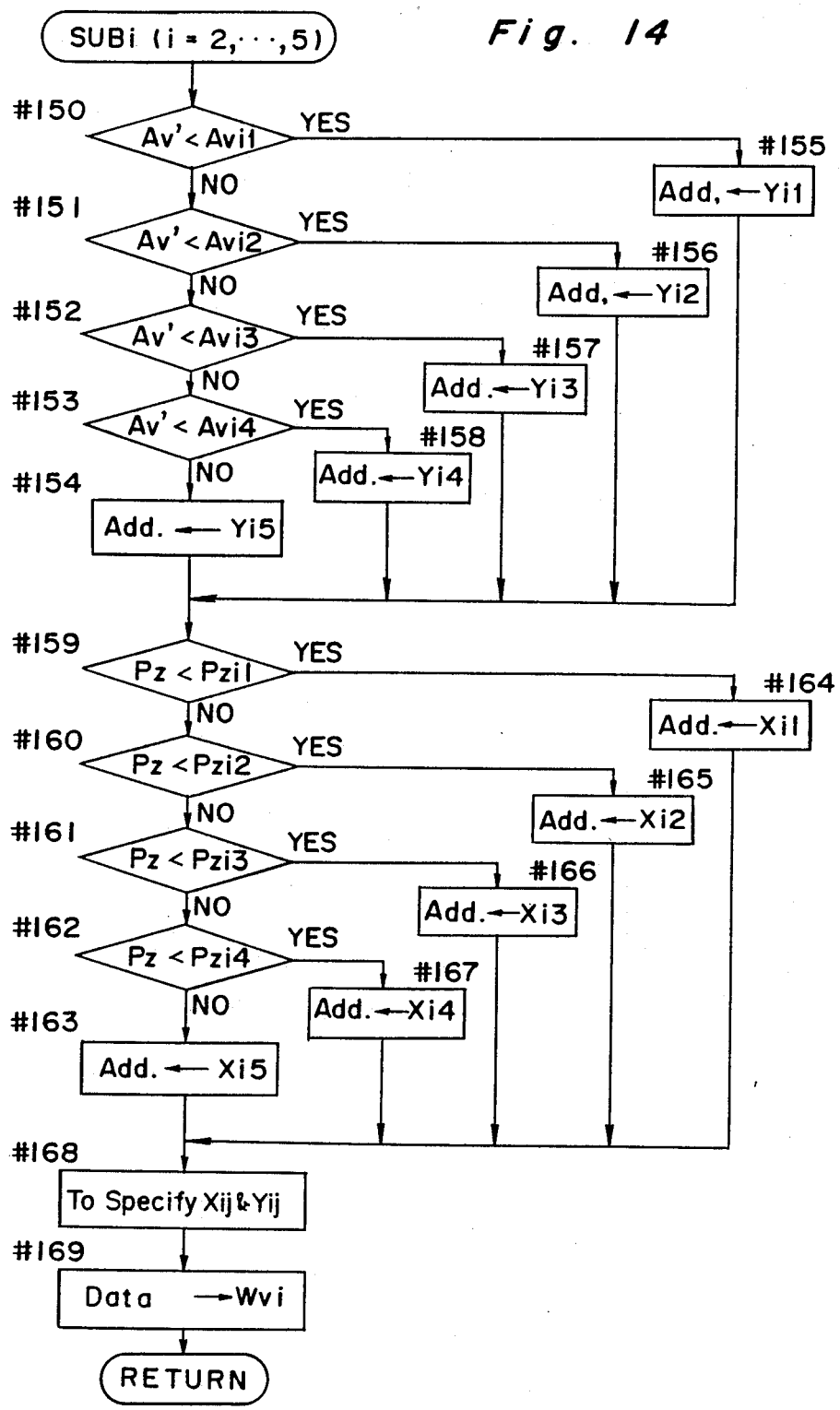

FIG. 14 illustrates a subroutine SUBi (i=2, ..., 5) for the calculation of the correction values Wvi for the measured light values at open aperture, associated with the peripheral metering areas of the screen. At the peripheral metering areas of the screen, by storing a data table wherein the correction values of the measured light values are mapped with the full open aperture value Av' and the distance Pz from the exit pupil to the focusing face and then by reading them, the light measurement correction value for the interchangeable lens assembly is determined. The data table in which the correction values are mapped in relation to the full open aperture value Av' and the distance Pz from the exit pupil to the focusing face is shown in Table 4, it being however to be noted that the method of division of respective values of the full open aperture value Av' and the distance Pz from the exit pupil to the focusing face can be varied with the element number i. The subroutine SUBi corresponding to the element number i ($=2, \ldots, 5$) is selected during the execution of the program steps #121 to #123.

TABLE 4

| Av' | Pz | | | | |
|---|---|---|---|---|---|
| | Smaller < Pzi1 | < Pzi2 | < Pzi3 | < Pzi4 < | Larger |
| Smaller | W11 | W12 | W13 | W14 | W15 |
| Avi1 | W21 | W22 | W23 | W24 | W25 |
| Avi2 | W31 | W32 | W33 | W34 | W35 |
| Avi3 | W41 | W42 | W43 | W44 | W45 |
| Avi4 | W51 | W52 | W53 | W54 | W55 |
| Larger | | | | | |

During the execution of the program steps #150 to #153, the address Yij corresponding to the full open aperture value Av' is set. In other words, if a result of decision at step #150 indicates that Av' is smaller than Avi1, Yi1 is set in the address at step #155; if a result of decision at step #151 indicates that Av' is equal to or larger than Avi1, but smaller than Avi2, Yi2 is set in the address at step #156; if a result of decision at step #152 indicates that Av' is equal to or larger than Avi2, but smaller than Avi3, Yi3 is set in the address at step #157; and, if a result of decision at step #153 indicates that Av' is equal to or larger than Avi3, but smaller than Avi4, Yi4 is set in the address at step #158. However, if the result of decision at step #153 indicates that Av' is equal to or larger than Avi4, Yi5 is set in the address at step #154. Also, during the execution of the program steps #159 to #162, an address Xij appropriate to the distance Pz from the exit pupil to the focusing face is set. In other words, if a result of decision at step #159 indicates that Pz is smaller than Pzi1, Xi1 is set as an address at step #164; if a result of decision at step #160 indicates that Pz is equal to or larger than Pzi1, but smaller than Pzi2, Xi2 is set as an address at step #165; if a result of decision at step #161 indicates that Pz is equal to or larger than Pzi1, but smaller than Pzi3, Xi3 is set as an address at step #166; if a result of decision at step #162 indicates that Pz is equal to or larger than Pzi3, but smaller than PziZ, Xi4 is set as an address at step #167 and if the result of decision at step #162 indicates that Pz is equal to or larger than Pzi4, Xi5 is set as an address at step #163. In this way, a ROM table in which the data table shown in Table 4 is stored is specified by the addresses Xij and Yij so set so that data so stored at such addresses can be inputted to the correction value Wvi. It is to be noted that the correction values shown in Table 4 are expressed by ($Av' = \log_2 Fno^2$) and are so determined as to cause the light measurement correction values Wv2 and Wv5, associated with the measurement at the upper portion of the screen, to satisfy the relationship shown in FIG. 7(b), and also to cause the light measurement correction values Wv3 and Wv4, associated with the measurement at the lower portion of the screen, to satisfy the relationship shown in FIG. 7(c).

MODIFICATION I (Change in Full Open Aperture Value)

In the foregoing embodiments, it has been described that the correction value is inferred from the full open aperture value $Av'(=Avo+\Delta Av)$. In practice, however, with increase in forward movement of the lens assembly, a difference in full open aperture value occurs than that under a condition in which the target object is located an infinite distance. If the actual full open aperture value is assumed to be an effective full open aperture value effAv', the following equation can be established.

$$effAv' = Av' + 2\log_2(1+\beta) \qquad (3)$$

wherein $\beta$ represents a magnification factor. At equal magnification ($\beta = 1$), effAv' = Av' + 2 and, hence, it will readily be understood that the effective full open aperture value varies considerably. Accordingly, for the purpose of precise exposure control, it is advisable to determine the correction value with the use of the effective full open aperture value effAv'. The effective full open aperture value effAv' can be obtained from the distance signal L obtained at the address 50 to 6F and the focal length f obtained at the address 05 or 30 to 3F as shown in Table 1 and 2. According to a simple calculation, the magnification factor $\beta$ can be calculated from the following equation.

$$\beta \approx f/L \qquad (4)$$

By inserting this equation (4) in the equation (3), the effective full open aperture value effAv' can be determined. Then, in the correction value calculating subroutine shown in FIGS. 13 and 14, by performing the following substitution, the more accurate correction value Wv can be selected.

$$Av' \leftarrow Av' + 2\log_2(1+\beta)$$

MODIFICATION II (Change in Distance from Exit Pupil to Focusing Face)

In the foregoing embodiments, in the zoom lens assembly wherein the distance Pz from the exit pupil to the focusing face varies with zooming, that is, change in focal length, the distance is rendered to be a variable parameter which varies with the zooming as shown in Table 2. However, other than that, it is preferred to render the distance Pz to be a variable parameter which may vary with the forward movement of the lens assembly that can be moved in a considerable amount for the purpose of macro-photography. By way of example, when the lens assembly of 50 mm in focal length is moved for focusing so that a life-size picture can be taken, the exit pupil will be correspondingly moved a distance of 50 mm forwards with the consequence that the distance Pz from the exit pupil to the focusing face doubles substantially. Therefore, if the distance Pz which can vary with the movement for focusing of the lens assembly is employed, the more accurate correction value Wv can be calculated.

As hereinbefore discussed, the correction value for the measured light value which varies depending on the structural details of the light measuring optical system in the camera body is calculated with the utilization of the information peculiar to the lens assembly. The light measurement can be carried out with the use of the currently available lens assembly on the camera body which would be improved in the future and, therefore, the data storage capacity required in each of the lens assembly and the camera body can suffice to be relatively small. Also, since the distance from the exit pupil to the focusing face and the full open aperture value are utilized for the calculation of the correction value for the measured light value, the correction of the measured light value can be highly precisely performed in the light measuring optical system of any construction.

Furthermore, since the field of view of the target object is divided at least into the central and peripheral portions of the screen and since the correction value for the measured light value associated with the peripheral portion of the field of view is calculated on the basis of both of the full open aperture value and the distance from the exit pupil to the focusing face whereas the correction value for the measured light value associated with the central portion of the field of view is calculated on the basis of only the full open aperture value, the calculation of the correction value associated with the central portion of the screen can be advantageously performed at a higher speed than the calculation of the correction value associated with the peripheral portion of the screen. Where the calculation of the correction value is carried out with reference to the data table, the data table associated with the central portion of the screen requires a smaller storage capacity than the data table associated with the peripheral portion of the screen.

It is to be noted that, where the central portion of the screen is used for the center-weighted spot metering, the correction value of the measured light value can be calculated with the use of only the data on the full open aperture value and, therefore, the exposure calculating time can be advantageously shortened.

Figure 3:
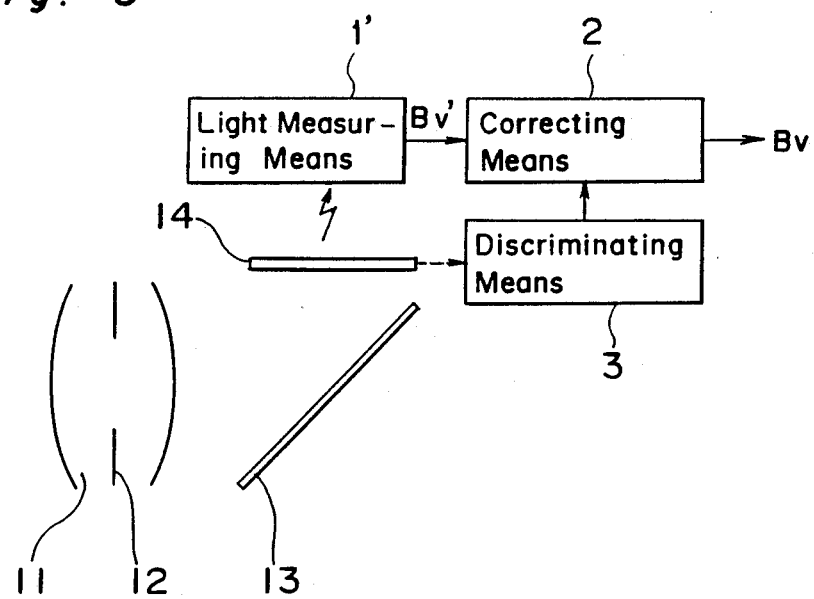

The following embodiment which will be described with reference to FIGS. 3 and 16 to 25 is applicable to the light measuring device for use in the single lens reflex camera having a capability of interchanging focusing screens, the principle of which is best shown in FIG. 3.

Referring to FIG. 3, the light measuring device for that camera comprises a light measuring means 1' for measuring the intensity of light reflected from the target object and passing through the photo-taking lens assembly 11 and the focusing screen 14, a focusing screen discriminating means 3 for discriminating the type of one of the focusing screens which is actually used, and a correcting means 2 for correcting the light measurement error in dependence on the discriminated type of the focusing screen. Considering that the measured light value Bv' measured by the light measuring means 1' varies with the light diffusivity of the focusing screen 14, the amount of variation thereof can be counterbalanced by the correcting means 2 and, therefore, the measured light value Bv outputted from the correcting means 2 represents a value which does not vary with any type of the focusing screens 14 interchangeably available for the single lens reflex camera.

More specifically, referring to FIGS. 16(a) to 16(c), the graphs shown therein illustrate the relationships between the distance Pz from the exit pupil to the focusing screen, the F-number of the lens assembly and the measurement error Wv exhibited when the focusing screen 14 having a light diffusivity higher than that which has exhibited the characteristic graphs of FIGS. 7(a) to 7(c). The graphs shown in FIGS. 16(a) to 16(c) corresponds in condition to those of FIGS. 7(a) to 7(c), respectively, and illustrate the measurement errors associated respectively with the central, upper and lower portions of the screen. As can be understood from FIG. 16, increase of the light diffusivity of the focusing screen 14 results in minimization of the measurement error Wv as a whole and, also, minimization of the amount of change of the measurement error Wv relative to the change in both of the distance Pz from the exit pupil to the focusing face and the F-number. This is because, as discussed with reference to FIG. 7, even though the light measurement takes place at a position diverting from the optical axis, the image formed on the focusing screen 14 can be viewed through the light measuring unit due to the high light diffusivity of the focusing screen 14. Conversely, where the light diffusivity is lowered, the measurement error Wv as a whole increases as shown in FIG. 7 and such a tendency as to increase the amount of variation of the light measurement error Wv due to the difference in distance Pz from the exit pupil to the focusing face and F-number will be exhibited at the upper and lower portions of the screen.

Figure 17:
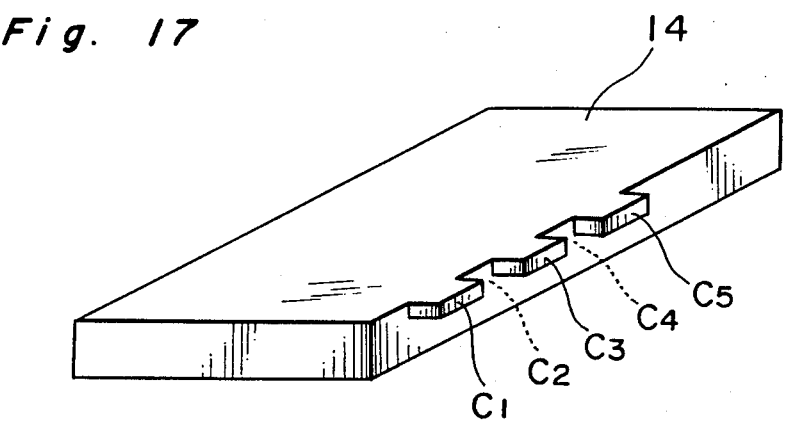
FIG. 17 is a perspective view of the focusing screen used in the light measuring optical system according to the different embodiment of the present invention.

An example of the focusing plate 14 which can be used in connection with the light measuring device according to this embodiment is shown in FIG. 17. The focusing screen 14 shown therein has one end formed with a plurality of projections $C_i (i=1, \ldots, 5)$. A 5-bit signal can be obtained depending on the combination of the presence and absence of these projections $C_i$ and the use of the five projections in a number of up to five is effective to permit 32 types ($=2^5$) of focusing screen 14 to be discriminated. So far illustrated, the focusing screen 14 is shown to have the three projections C1, C3 and C5 and have no projections C2 and C4, thereby signifying a binary code of "10101".

Figure 18:
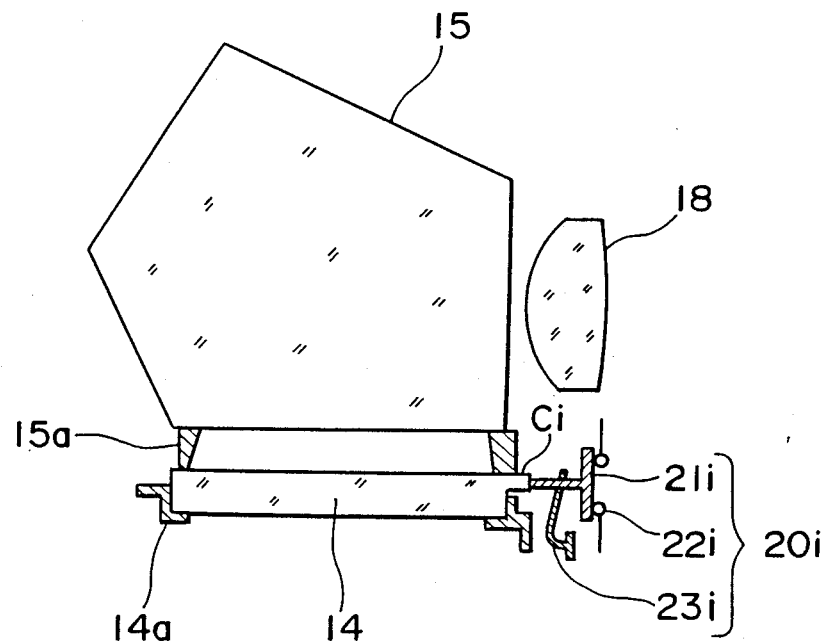
FIG. 18 is a schematic sectional view showing a device for discriminating the type of the focusing screen used.

The discriminating means 3 shown in FIG. 3 is best shown FIG. 18. As shown in FIG. 18, the focusing screen 14 is supported on a holder 14a positioned beneath the pentagonal roof prism 15 which is supported by a prism holder 15a interposed between the focusing screen 14 and the prism 15. Reference numeral 20i represents detecting devices for the detection of the respective projections integral with the focusing screen 14. Each of these projection detecting devices 20i comprises an electroconductive movable pin 21i, a pair of contacts 22i and a biasing spring, for example, a leaf spring 23i, for urging the movable pin 21i so as to separate from the pair of contacts 22i. Assuming that the focusing screen 14 of the particular construction shown in FIG. 17 is mounted on the holder 14a in the camera body, the projections Ci integral with the focusing screen 14 confront the associated projection detecting devices 20i. When the projections Ci press the associated movable pins 21i, the movable pins 21i are brought into contact with the associated pairs of the contacts 22i, causing the associated detectors 20i generating respective ON signals. In the event of the absence of the projections Ci, the movable pin 21i will not be pressed and remain biased by the leaf springs 23i so as to be separated from the associated pairs of the contacts 22i and, therefore, the respective detecting devices 20i will output OFF signals. In this way, by causing the projection detecting devices 20*i* to convert the type of the focusing screen 14 actually used into an electric signal, the type of the focusing screen 14 actually used can be identified.

Figure 20:
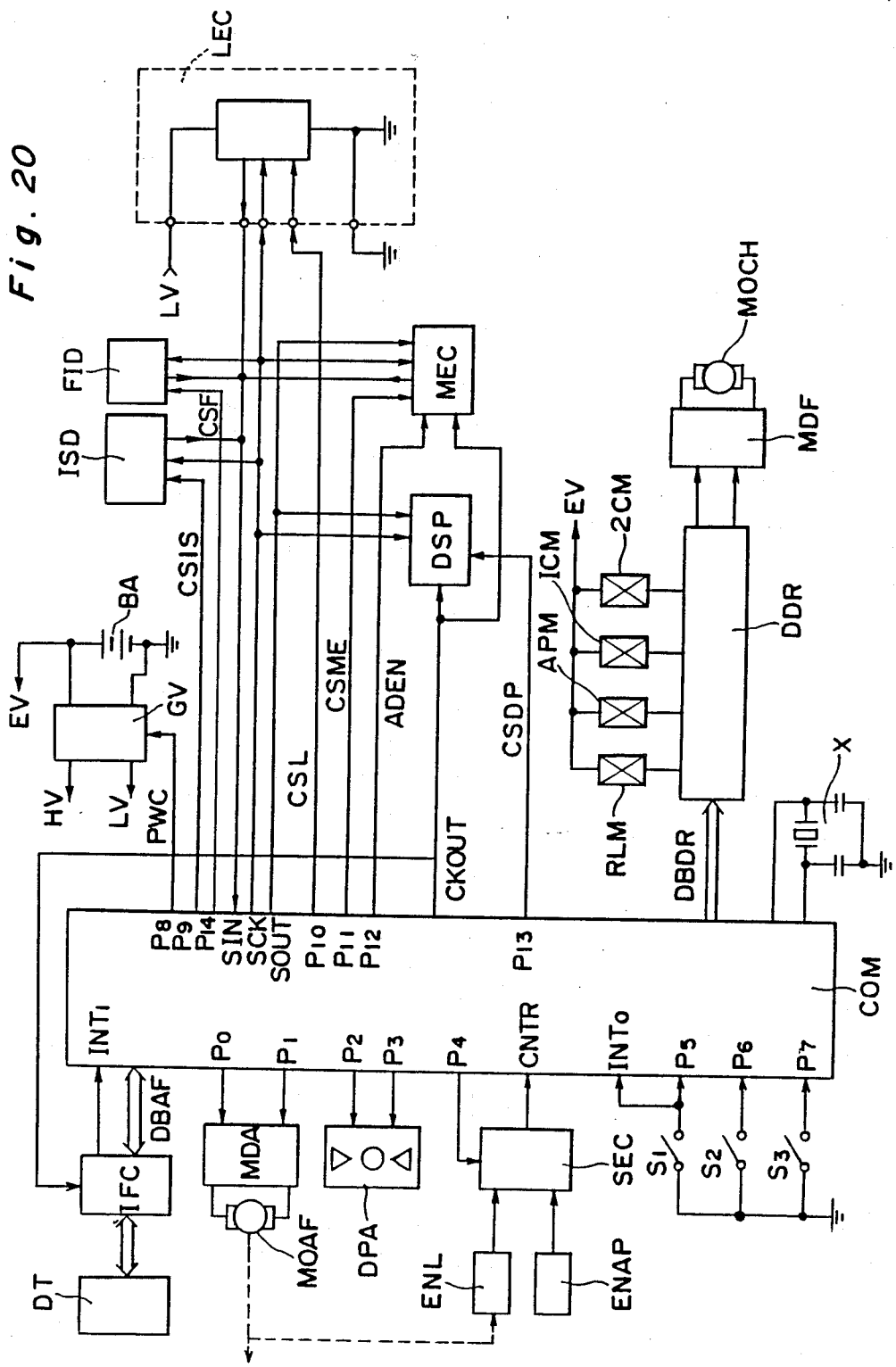
FIG. 20 is a diagram similar to FIG. 9, showing the electric circuitry used in the camera system utilizing the light measuring optical system according to the different embodiment of the present invention.

The camera system employing the focusing screen discriminating means 3 is illustrated in FIG. 20. The circuit block diagram of FIG. 20 is substantially similar to that shown in FIG. 9, except that a focusing screen discriminating circuit FID adapted to be powered by the low voltage LV is added to the circuitry of FIG. 9. More specifically, as shown in FIG. 20, the focusing screen discriminating circuit FID is operable to read a code descriptive of the type of the focusing screen 14 actually used, which code is outputted to the serial input terminal SIN in synchronism with the serial clock SCK which is generated from the microcomputer COM when a focusing screen discriminating circuit selecting signal CSF outputted from an output port p14 of the microcomputer COM is in a logic low level state.

Figure 21:
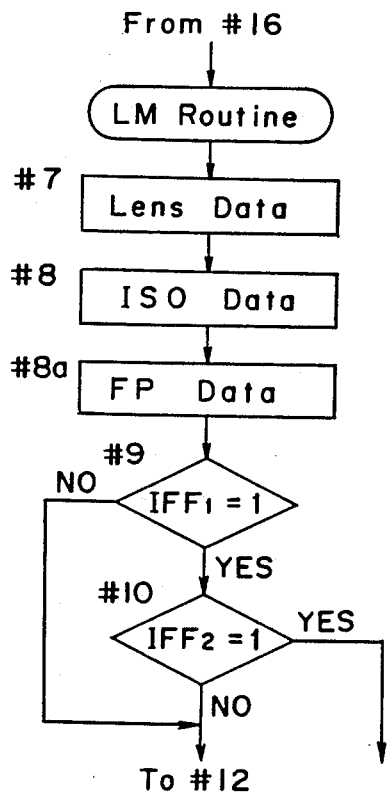
FIG. 21 is a diagram showing a portion of the flowchart of FIG. 10 which is modified for the purpose of the different embodiment of the present invention.

Even the camera system utilizing the focusing screen discriminating means 3 can operate in a manner substantially similar to that envisaged by the flowchart of FIG. 10. However, the employment of the focusing screen discriminating means 3 necessitates an additional process step #8*a* to be performed subsequent to the process step #8 and prior to the decision step #9 as shown in FIG. 21. During the process step #8*a*, the code (FP data) indicative of the type of the focusing screen 14 actually used in the camera system is supplied from the focusing screen discriminating circuit FID shown in FIG. 20. Also, the Ev calculating step which has been described as performed at step #19 is detailed in FIG. 22.

Figure 22:
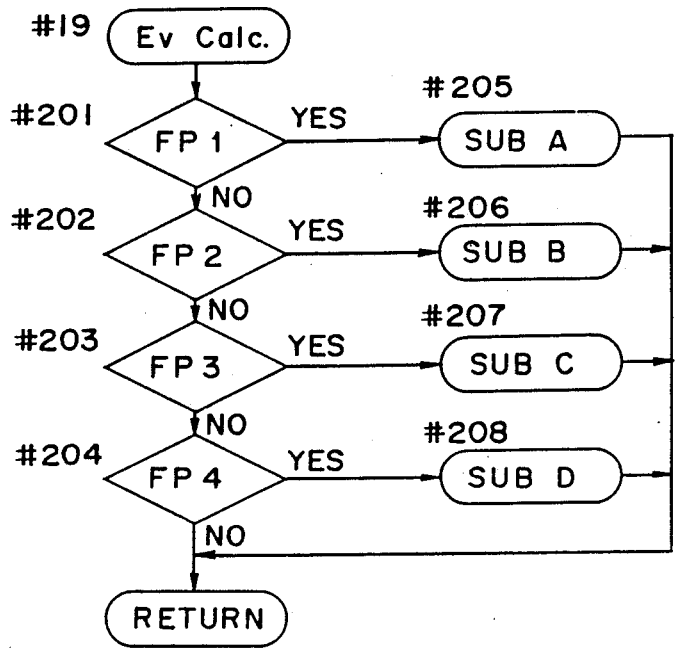
FIGS. 22 to 25 are flowcharts showing respective subroutines executed by the camera system according to the different embodiment of the present invention.
Figure 23:
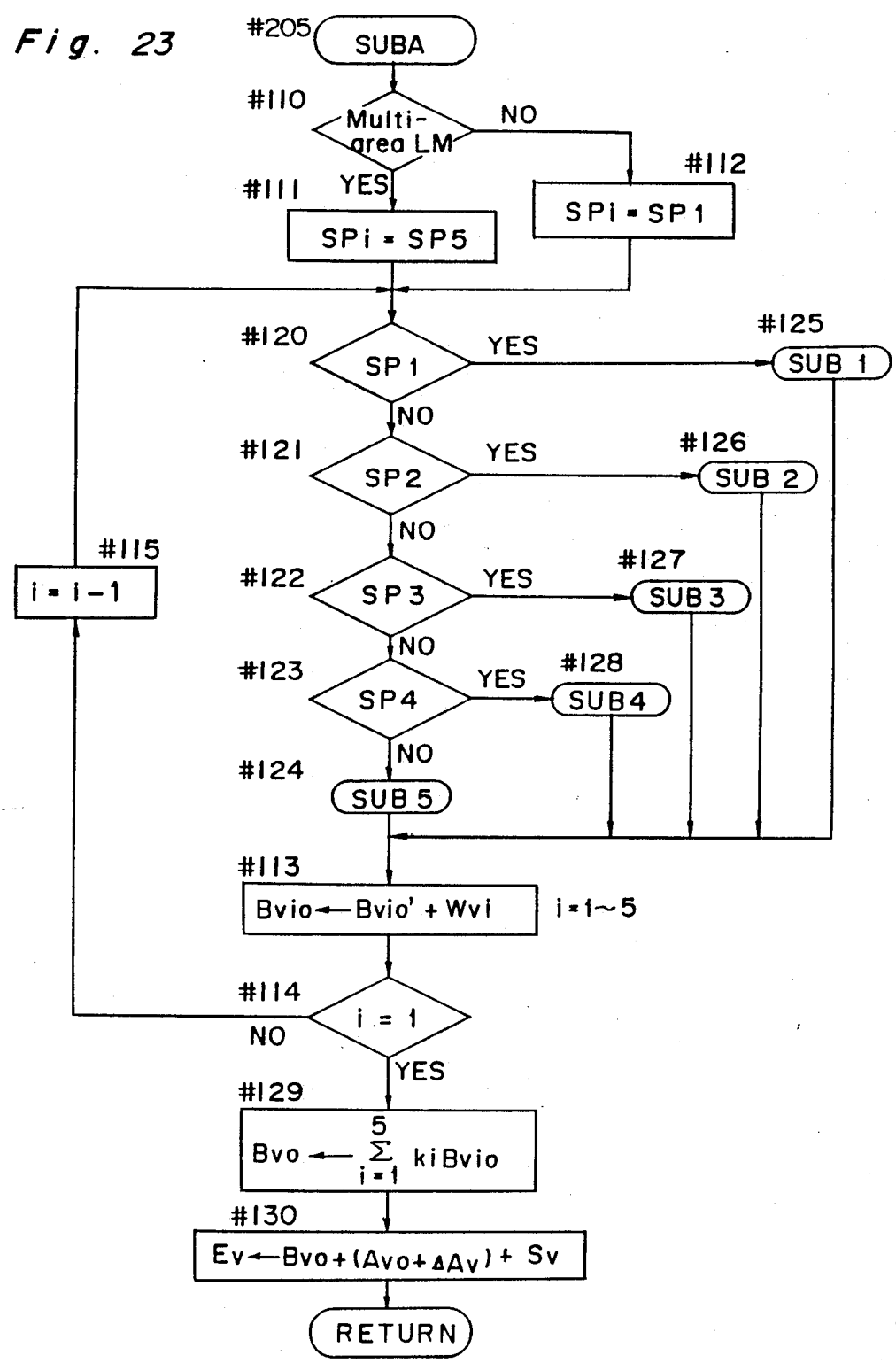

Referring now to FIG. 22, and assuming that four types of the focusing screens 14 are available for the illustrated camera system, subroutines SUBA to SUBD are called for when codes FPi indicative of the respective types of the focusing screens 14 are expressed by FP1 to FP4. In other words, if a result of decision at step #201 indicates that the code FPi of the focusing screen 14 is FP1, the program flow proceeds to step #205 at which the subroutine SUBA shown in FIG. 23 is called for, but if it does not indicate that the code FPi is FP1, the next succeeding decision is made at step #202 to determine if the code FPi is FP2. If the result of the decision at step #202 indicates FPi=FP2, the program flow proceeds to step #206 at which the subroutine SUBB is called for, but if it does not indicate FPi=FP2, then the next succeeding decision is made at step #203 to determine if FPi=FP3. If the result of the decision at step #203 indicates FPi=FP3, the program flow proceeds to step #207 at which the subroutine SUBC is called for, but if it does not indicate FPi=FP3, a further decision is made at step #204 to determine if FPi=FP4. Should the result of the decision at step #204 indicate FPi=FP4, the subroutine SUBD is called for at step #208, but if it does not indicate FPi=FP4, it means that no focusing screen is mounted and, therefore, the program flow returns.

The details of the subroutine SUBA called for at step #205 of FIG. 22 are illustrated in FIG. 23. Assuming that the screen in the multi-area light metering system is divided into five areas, correction values associated with the light receiving elements SPi (wherein i represents the cell number ranging from 1 to 5) are calculated during execution of respective subroutines SUB1 to SUB5 as shown by steps #120 to #128. Once the respective correction values Wvi associated with the respective light receiving elements SPi are determined, true brightness values Bvio associated with the respective light receiving elements SPi are determined at step #113. When each of the brightness values Bio is weighted by a coefficient ki preset for each cell number i and all of the brightness values are then summed together, a proper brightness value Bvo can be calculated at step #129 and, therefore, an exposure value Ev is then obtained at step #130. It is to be noted that, where instead of the multi-area light metering system a center-weighted metering system is employed, all that is necessary is to determine the correction value Wv1 associated only with the light receiving element SP1 having the cell number i of 1 and the calculation of the correction values Wv2 to Wv5 associated with the light receiving elements SP2 to SP5 having the cell number i of 2 to 5 (steps #110 to #115) is omitted for the purpose of enhancing the speed of calculation of the exposure value. In such case, at step #129, the measured light value after the correction made with respect to the light receiving element SP1 used to measure the intensity of light at the central portion of the screen can be used as Bvo.

Let it be assumed that, if the code FPi of the focusing screen 14 is FP1, the focusing screen 14 identified by the code FP1 is of a type having a low light diffusivity enough to exhibit such characteristics as shown in FIG. 7. In this case, the subroutine SUB1 which is shown in and described with reference to FIG. 13 is executed at step #125 of FIG. 23.

Although the details of the subroutines SUBB and SUBC which are called for when the code of the focusing screen 14 is FPi=FP2 and FPi=FP3 are not shown, they should be understood as similar to the subroutine SUBA except that a specific value of the light measurement correction value Wv differs from that in the subroutine SUBA. By way of example, if the code FPi of the focusing screen 14 is FP2, and assuming that the focusing screen 14 has a high light diffusivity enough to exhibit such characteristics as shown in FIG. 16, the correction value used in the subroutine SUBB is specifically expressed by $Av'(=\log_2 Fno^2)$ such that the correction value Wv1 associated with the central portion of the screen, the correction values Wv2 and Wv3 associated with the upper portions of the screen and the correction values Wv4 and Wv5 associated with the lower portions of the screen can satisfy such relationships of FIGS. 16(*a*), 16(*b*) and 16(*c*), respectively.

As can be understood from FIG. 16, where the focusing screen having a high light diffusivity is employed, the correction value can be chosen in dependence on the aperture value Av' and, as the case may be, it may be chosen to be zero. Conversely, where the focusing screen having a low light diffusivity is employed, the correction value varies considerably, as shown particularly in FIGS. 7(*b*) and 7(*c*), with change in distance Pz from the exit pupil to the focusing face and F-number and, therefore, it is recommended to increase the number of Av' and Pz, in each of Tables 3 and 4, to be divided, so that the accuracy can be improved.

Figure 19:
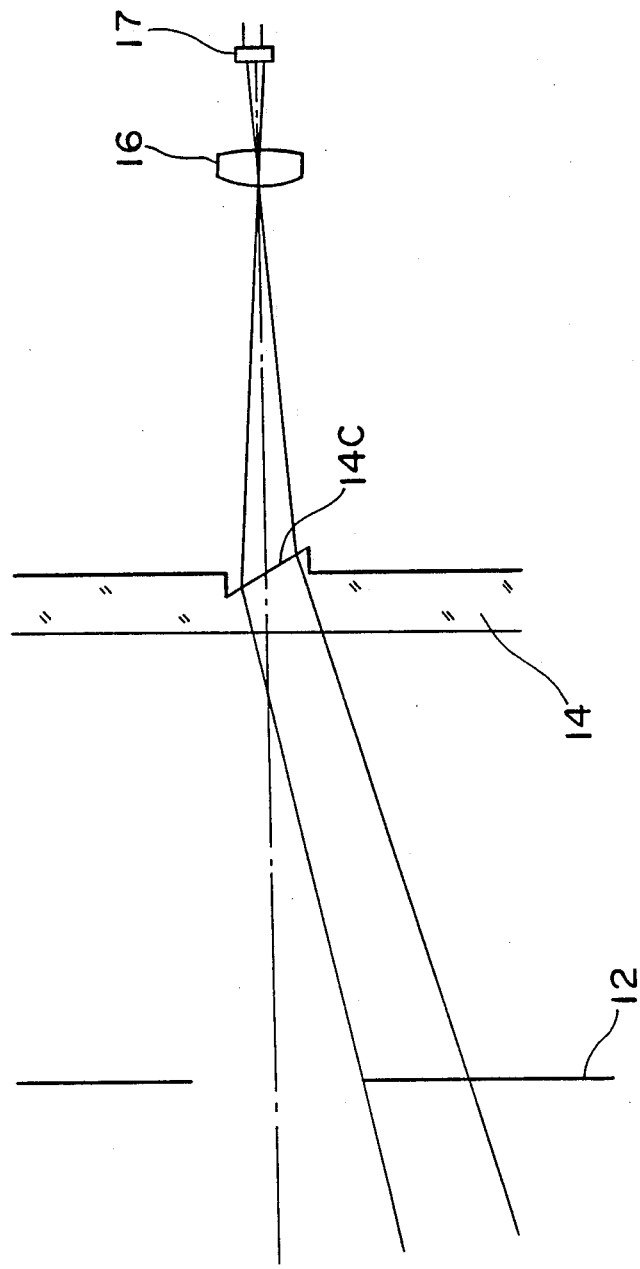
FIG. 19 is a diagram used to explain a light measuring area in the light measuring optical system according to the different embodiment of the present invention.
Figure 24:
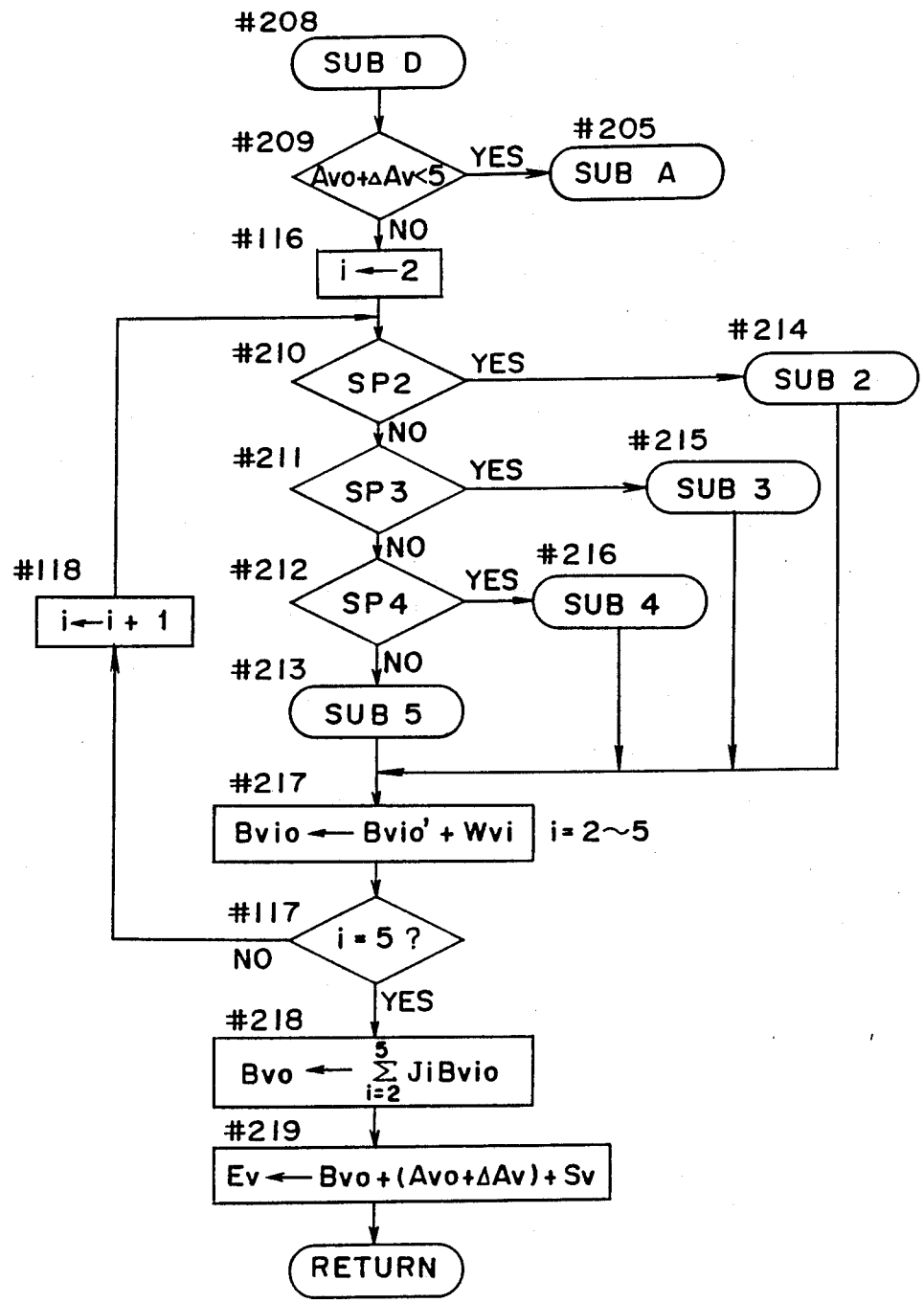

FIG. 24 illustrates the subroutine SUBD which is called for in the event that the code FPi of the focusing screen 14 is FP4. In the embodiment now under discussion, it is assumed that, where the code FPi of the focusing screen 14 is FP4, the focusing screen 14 is of a type wherein a prism is provided at the center thereof for manual focus adjustment while a peripheral region around the prism is formed by a ground surface capable of exhibiting a light diffusivity similar to the focusing screen having the code FPi identified by FP1. Where the focusing screen 14 is provided at its center with a split-image prism or a microprism or a combination (split-microprism) thereof, the shape of the surface of the focusing screen 14 varies at local portions thereof and, therefore, it may often occur that the light flux for the light measurement may be vignetted. An example of this is shown in FIG. 19. Specifically, FIG. 19 illustrates how the light flux for the light measurement travel through the focusing screen 14 having the split-image prism at the central portion 14C thereof. In the case of the split-image prism, the central portion 14C of the focusing screen 14 is formed so as to represent a generally wedge-like shape as shown in FIG. 19 and, therefore, the light flux passing therethrough is bent by the action of the prism, rendering it to be apt to be vignetted by a diaphragm of the aperture 12. At the F-number greater than that represented by the illustrated aperture 12, that is, if the aperture is smaller than that shown in FIG. 19, the rays of light will no longer reach the light receiving element 17.

If the coverage of the light receiving element SP1 associated with the central portion shown in FIG. 15 is substantially equal to or smaller than the size of the central portion 14C of the focusing screen 14 where the split-image prism is provided, no measured light output will be available at an aperture smaller than a certain aperture size. In such case, no correction is made to the measured light output, but the light measuring algorithm itself requires a modification such as shown in FIG. 24.

Referring now to FIG. 24, assuming that the full open aperture value at which the light flux passing through the central portion 14C of the focusing screen 14 is first vignetted by the aperture 12 is (Avo+ΔAv)=5, and if a result of decision at step #209 indicates (Avo+ΔAv-)<5, the program flow proceeds to step #205 at which the subroutine SUBA is called for, but it indicates (Avo+δAv)≧5, the program flow proceeds to step #116 at which i=2 is set as the cell number of the light receiving element SPi, followed by step #210 at which a decision is made to determine if the light receiving element SPi is SP2. If the result of the decision at step #210 indicates that the light receiving element SPi is SP2, the subroutine SUB2 is called for at step #214, but if it does not indicate SPi=SP2, a subsequent decision is made at step #211 to determine if the light receiving element SPi is SP3. Where the result of decision at step #211 indicates SPi=SP3, the subroutine SUB3 is called for at step #215, but if it does not indicate SPi=SP3, a further decision is made at step #212 to determine if the light receiving element SPi is SP4. If the result of decision at step #212 indicates that the light receiving element SPi is SP4, the program flow proceeds to step #216 at which the subroutine SUB4 is called for, but if it does not indicate SPi=SP4, the subroutine SUB5 is called for at step #213. By the program process of a loop counter at steps #117 and #118, the correction values for the respective cases in which the cell number of the light receiving element SPi is i=2 to 5 can be calculated by the execution of the respective subroutines SIB2 to SUB5, but will not be calculated when the cell number of the light receiving element SPi is i=1. Once the correction values Wvi associated with the light receiving elements SPi are determined, the true brightness value Bvio associated with each light receiving element SPi is determined at step #217. When each of the brightness values Bvio is weighted by a coefficient Ji (i=2 to 5) preset for each cell number i and all of the brightness values are then summed together, a proper brightness value Bvo can be calculated at step #218 and, therefore, an exposure value Ev is then obtained at step #219.

MODIFICATION III

In the camera of the full open aperture metering system such as hereinbefore described, it is possible to measure the brightness of the target object at the full open aperture and then to determine the exposure amount at an arbitrarily chosen aperture value in reference to the measured light value. However, it often occurs that the aperture is stopped down from the full open aperture value to a controlled aperture value by manipulating a depth-of-field preview button when the depth of field of an image eventually imprinted on a picture is desired to be confirmed through the viewfinder. Since when the preview button is manipulated the aperture may be stopped down to the minimum aperture value, the amount of change of the aperture is very considerable. Accordingly, where the light measurement is carried out while the preview button is manipulated to stop down the aperture, and in the event that the camera employs the focusing screen 14 of a type having a low light diffusivity enough to exhibit such characteristics as shown in FIG. 7, the amount of measurement error Wv may vary considerably relative to the change in aperture and, therefore, this has to be corrected.

Figure 25:
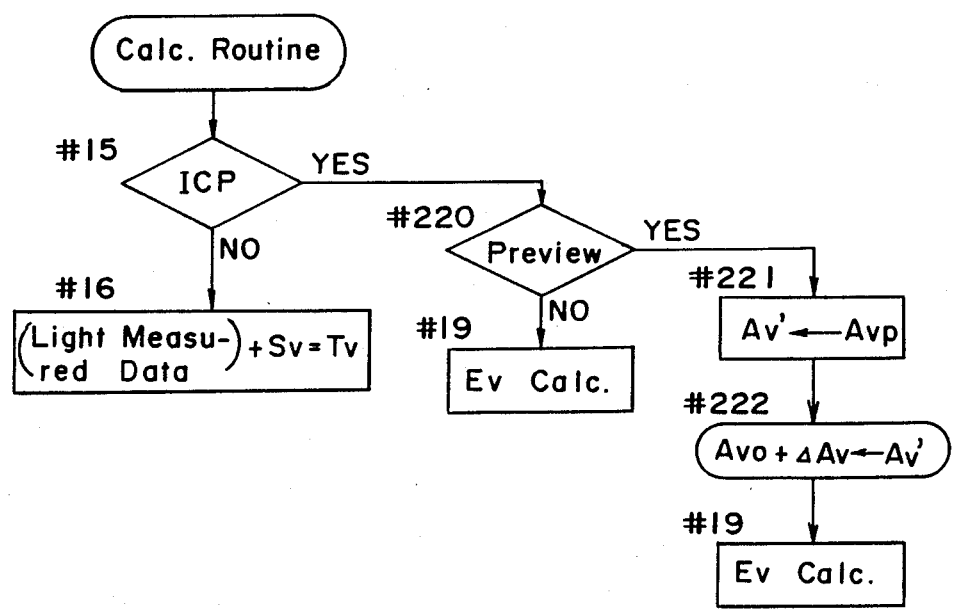

For this purpose, steps #220 to #222 shown in FIG. 25 are employed in the calculating routine shown in and described with reference to FIG. 10 for the determination of the proper exposure value Ev by the stopped-down metering which is performed at the time the preview button is manipulated. Assuming that the result of decision at step #15 has indicated that the lens mount signal ICP is inputted, an additional decision is made at step #220 before the program flows from step #15 to step #19. At step #220, the decision is made to determine if the preview button has been manipulated, and, if it has not been manipulated, the program flow proceeds to step #19 and the subsequent process takes place in the manner as hereinbefore described with reference to FIG. 10. However, if the result of decision at step #220 indicates that the preview button has been manipulated, the aperture value Av' used for the calculation of the light measurement error Wv during the execution of any one of the subroutines SUB1 to SUB5 is substituted at step #221 by an aperture value Avp attained at the time the preview button is manipulated, followed by step #222 at which the full open aperture value (Avo+-ΔAv) used for the exposure calculation at step #219 is substituted by the aperture value Av'. Thereafter, the program flow proceeds to step #19. Step #221 makes it possible to determine the light measurement error Wv exhibited when the aperture is stopped down, in a manner similar to that determined at the full aperture setting, and step #222 makes it possible to calculate the proper exposure value Ev to be employed when the preview button is manipulated.

Thus, according to the embodiment of the present invention shown in and described with particular reference to FIGS. 3 and 16 to 25, the camera system is effective to determine the type of focusing screen which is actually used in the camera body and to correct the measured light value in dependence on the type of focusing screen. Therefore, a variety of focusing screens of different light diffusivity can be interchangeably used in one particular model of camera embodying the present invention. Moreover, the correction of the measured light value which may be necessitated when one focusing screen is replaced with another type can be automatically performed, thus lessening the burden the photographer may suffer.

Also, considering the frequent occurrence that the focusing screens of one particular type being manufactured by the use of a molding technique deviate in light diffusivity, the use of the light measuring device according to the present invention in the camera system is effective to compensate for the deviation and, in this respect, as far as the accuracy of the light measurement is concerned, 100% yield of good focusing screens is possible.

It is to be noted that, where the focusing screen of the type provided at its central portion with the split-image prism, the microprism or the split microprism, and if the F-number is greater than a predetermined value, it may occur that in the multi-area light metering system, the measured light value associated with the central portion of the focusing screen cannot be obtained. In such case, it is possible to change the algorithm for the light measurement so that the measured light value associated with the central portion of the focusing screen will not be used.

Although the present invention has fully been described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

What is claimed:

1. A light measuring device for a full-aperture metering, lens-interchangeable photographic camera of a type capable of measuring the brightness of a target object to be photographed through a photo-taking lens assembly for the determination of an exposure amount, said device comprising:
   means for receiving incident light arranged in a position deviated from an optical axis of the photo-taking lens;
   a reading means for reading, from an interchangeable lens assembly, data associated with an exit pupil of the interchangeable lens assembly and data associated with the full aperture value of the interchangeable lens assembly; and
   a correcting means for calculating a correction value for a measured light value on the basis of the data read out by the reading means, for the purpose of exposure correction, said correction value being calculated such that the correction value varies over a relatively large range in response to a variation of the data associated with the exit pupil when the full aperture value represented in F number of the interchangeable lens assembly is large, and the correction value varies over a relatively small range in response to a variation of the data associated with the exit pupil when the full aperture value represented in F number of the interchangeable lens assembly is small.

2. The device as claimed in claim 1, wherein said correcting means is provided with a data table in which the correction values corresponding to the respective data associated with the exit pupil and the full aperture value of the interchangeable lens assembly are stored.

3. A light measuring device for a full-aperture multi-area metering, lens-interchangeable camera of a type wherein a screen is divided into at least a central portion and a peripheral portion and wherein the brightness of each of the central and peripheral portions of the screen is measured at full aperture setting for the determination of a proper exposure amount on the basis of the measured light values, said device comprising:
   means for receiving incident light arranged in a position deviated from an optical axis of the photo-taking lens;
   a reading means for reading, from an interchangeable lens assembly, respective data associated with an exit-pupil distance and the full aperture value; and
   a correcting means for calculating a correction value on the basis of the full aperture value with respect to a measured light value associated with the central portion of the screen, calculating a correction value on the basis of both of the full aperture value and the exit-pupil distance with respect to a measured light value associated with the peripheral portion of the screen, said correction value being calculated such that the correction value varies over a relatively large range in response to a variation of the exit pupil distance when the full aperture value represented in F number of the interchangeable lens assembly is large, and the correct value varies over a relatively small range in response to a variation of the exit pupil distance when the full aperture value represented in F number of the interchangeable lens assembly is small, and then said correcting means correcting the measured light values of the respective portions of the screen.

4. The device as claimed in claim 3, wherein the correcting means is provided with a first data table in which the correction values corresponding to the measured light value associated with the central portion of the screen are stored in correspondence with the full aperture value, and a second data table in which the correction values corresponding to the measured light value associated with the peripheral portion of the screen is stored in correspondence with the respective data of the exit pupil and the full aperture value of the interchangeable lens assembly.

5. A light measuring device for a single reflex camera having a capability of interchanging focusing plates, said device comprising:
   a light receiving means for receiving light reflected from a target object to be photographed and passing through a photo-taking lens assembly arranged in a position deviated from an optical axis of the photo-taking lens;
   a light measuring means for measuring the intensity of light which is received by said light receiving means;
   a focusing plate discriminating means for discriminating the type of one of the focusing plates which is actually used;
   a first correcting means for correcting an error in light measurement, performed by the light measuring means, in dependence on the discriminating type of the focusing plate; and
   a reading means for reading, from an interchangeable lens assembly, data associated with an exit pupil of the interchangeable lens assembly and data associated with the full aperture value of the interchangeable lens assembly; and a second correcting means for calculating a correction value for a measured light value on the basis of the data read out by the reading means, for the purpose of exposure correction, said correction value being calculated such that the correction value varies over a relatively large range in response to a variation of the data associated with the exit pupil when the full aperture value represented in F number of the interchangeable lens assembly is large, and said correction value varies over a relatively small range in response to a variation of the data associated with the exit pupil when the full aperture value represented in F number of the interchangeable lens assembly is small.

6. A light measuring device for a single reflex camera having a capacity of interchanging focusing plates which comprises:

a light receiving means for receiving light reflected from a target object to be photographed and passing through a photo-taking lens assembly and having a plurality of light receiving elements each of which receives light from a different area in the field of photography;

a light measuring means for measuring the intensity of light received by said light receiving means;

a focusing plate discriminating means for discriminating the type of one of the focusing plates which is actually used; and a correcting means for correcting errors in the measured intensity of the light at every light receiving element, in dependence on the discriminated type of the focusing plate.

7. The device as claimed in claim 6, wherein said correcting means further corrects an error in light measurement which is a full-aperture metering error resulting from the change of the photo-taking lens assembly with another one.

8. The device as claimed in claim 6, wherein said correcting means further corrects an error in light measurement which is a stopped-down aperture metering error resulting from the manipulation of a preview button.

9. The device as claimed in claim 6, wherein said correcting means includes a data table in which the correction values corresponding to the type of the focusing plate are stored at every light receiving element.

10. A camera system having a zoom lens, including a light measuring device which measures the intensity of light reflected from a target object to be photographed and passing through the zoom lens, comprising:

a producing means for producing a signal indicating data associated with an exit pupil and with a full aperture value of the zoom lens corresponding to a focal length set by a zooming operation; and a correcting means for calculating a correction value for a measured light value for a purpose of exposure correction, said correcting means including a data table in which the correction values corresponding to the respective data associated with the exit pupil and with the full aperture value of the zoom lens are stored.

11. A light measuring device for a full-aperture metering, lens-interchangeable photographic camera of a type capable of measuring the brightness of a target object to be photographed through a photo-taking lens assembly for the determination of an exposure amount, said device comprising:

a reading means for reading, from an interchangeable lens assembly, data associated with an exit pupil of the interchangeable lens assembly and data associated with the full aperture value of the interchangeable lens assembly; and a correcting means for calculating a correction value for a measured light value on the basis of the data read out by the reading means, for the purpose of exposure correction, said correcting means comprising a data table in which the correction values corresponding to the respective data associated with the exit pupil and the full aperture value of the interchangeable lens assembly are stored.

12. A light measuring device for a full-aperture multi-area metering, lens-interchangeable camera of a type wherein a screen is divided into at least a central portion and a peripheral portion and wherein the brightness of each of the central and peripheral portions of the screen is measured at full aperture setting for the determination of a proper exposure amount on the basis of the measured light values, said device comprising:

a reading means for reading, from an interchangeable lens assembly, respective data associated with an exit-pupil distance and the full aperture value; and a correcting means for calculating a correction value on the basis of the full aperture value with respect to a measured light value associated with the central portion of the screen, and calculating a correction value on the basis of both of the full aperture value and the exit-pupil distance with respect to a measured light value associated with the peripheral portion of the screen, and then correcting the measured light values of the respective portions of the screen, said correcting means comprising a first data table in which the correction values corresponding to the measured light value associated with the central portion of the screen are stored in correspondence with the full aperture value, and a second data table in which the correction values corresponding to the measured light value associated with the peripheral portion of the screen is stored in correspondence with the respective data of the exit pupil and the full aperture value of the interchangeable lens assembly.

* * * * *